(12) United States Patent
Mizumoto et al.

(10) Patent No.: US 11,461,253 B2
(45) Date of Patent: Oct. 4, 2022

(54) SEMICONDUCTOR DEVICE AND ACCESS CONTROL METHOD

(71) Applicant: RENESAS ELECTRONICS CORPORATION, Tokyo (JP)

(72) Inventors: Katsuya Mizumoto, Tokyo (JP); Toshiyuki Hiraki, Tokyo (JP); Nobuhiko Honda, Tokyo (JP); Sho Yamanaka, Tokyo (JP); Takahiro Irita, Tokyo (JP); Yoshihiko Hotta, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 114 days.

(21) Appl. No.: 17/150,565

(22) Filed: Jan. 15, 2021

(65) Prior Publication Data

US 2021/0141749 A1  May 13, 2021

Related U.S. Application Data

(63) Continuation of application No. 16/000,659, filed on Jun. 5, 2018, now Pat. No. 10,929,317.

(30) Foreign Application Priority Data

Jun. 30, 2017 (JP) .............................. JP2017-128728

(51) Int. Cl.
*G06F 13/16* (2006.01)
*G06F 13/362* (2006.01)
*G06F 13/18* (2006.01)

(52) U.S. Cl.
CPC ...... *G06F 13/1673* (2013.01); *G06F 13/1605* (2013.01); *G06F 13/1689* (2013.01); *G06F 13/18* (2013.01); *G06F 13/362* (2013.01)

(58) Field of Classification Search
CPC ............ G06F 13/1673; G06F 13/1605; G06F 13/1689; G06F 13/18; G06F 13/362
See application file for complete search history.

(56) References Cited

U.S. PATENT DOCUMENTS 6,430,641 B1    8/2002  Hofmann et al.
7,610,421 B2 * 10/2009  Nakazono ........... G06F 13/3625
                                            710/111
(Continued)

FOREIGN PATENT DOCUMENTS

JP    2011-150759 A    8/2011
WO    2017/056132 A1   4/2017

OTHER PUBLICATIONS

Japanese Notice of Reasons for Refusal issued in corresponding Japanese Patent Application No. 2017-128728, dated Dec. 4, 2020, with English translation.

(Continued)

*Primary Examiner* — William E. Baughman
*Assistant Examiner* — Janice M. Girouard
(74) *Attorney, Agent, or Firm* — McDermott Will & Emery LLP

(57) ABSTRACT

Access control is achieved in consideration of write training. Masters issue access requests including a read request and a write request. A memory controller accesses memory in response to the access requests issued by the maters. A central bus-control system controls the output of the access requests issued by the masters to the memory controller. A training circuit conducts training on the memory while the access to the memory is stopped. The central bus-control system further controls the execution of the training on the memory. During the training, the central bus-control system (Continued)

suppresses the output of the read request to the memory controller from among the access requests issued by the masters.

11 Claims, 9 Drawing Sheets

(56) References Cited

U.S. PATENT DOCUMENTS

| | | | |
|---|---|---|---|
| 7,647,467 B1 | 1/2010 | Hutsell et al. | |
| 9,058,135 B1 | 6/2015 | Schumacher et al. | |
| 9,111,632 B2* | 8/2015 | Sato | G11C 7/1072 |
| 2002/0161956 A1* | 10/2002 | Kanzaki | G06F 13/161 |
| | | | 710/240 |
| 2006/0280012 A1 | 12/2006 | Pemer | |
| 2009/0013144 A1* | 1/2009 | Kitamura | G06F 13/1605 |
| | | | 711/E12.001 |
| 2009/0295438 A1* | 12/2009 | Jammula | G11C 29/023 |
| | | | 327/154 |
| 2011/0119439 A1 | 5/2011 | Blackmon et al. | |
| 2011/0283060 A1 | 11/2011 | Ware et al. | |
| 2014/0223053 A1* | 8/2014 | Yoshida | G06F 13/362 |
| | | | 710/110 |
| 2015/0310899 A1 | 10/2015 | Sato et al. | |
| 2016/0172013 A1 | 6/2016 | Dearth et al. | |
| 2017/0017593 A1* | 1/2017 | Lunadier | G06F 13/4022 |
| 2017/0068482 A1 | 3/2017 | Ramalingam et al. | |
| 2017/0148502 A1 | 5/2017 | Ikarashi | |
| 2017/0270063 A1 | 9/2017 | Yamanaka et al. | |

OTHER PUBLICATIONS

Extended European Search Report issued in corresponding European Patent Application No. 18178696.3-1224, dated Dec. 19, 2018.
U.S. PTO Non-Final Office Action issued in related parent U.S. Appl. No. 16/000,659, dated Jun. 25, 2019.
U.S. PTO Non-Final Office Action issued in related parent U.S. Appl. No. 16/000,659, dated Dec. 19, 2019.
U.S. PTO Final Office Action issued in related parent U.S. Appl. No. 16/000,659, dated May 20, 2020.
U.S. PTO Notice of Allowance issued in related parent U.S. Appl. No. 16/000,659, dated Oct. 23, 2020..
Parent U.S. Appl. No. 16/000,659, filed Jun. 5, 2018.

* cited by examiner

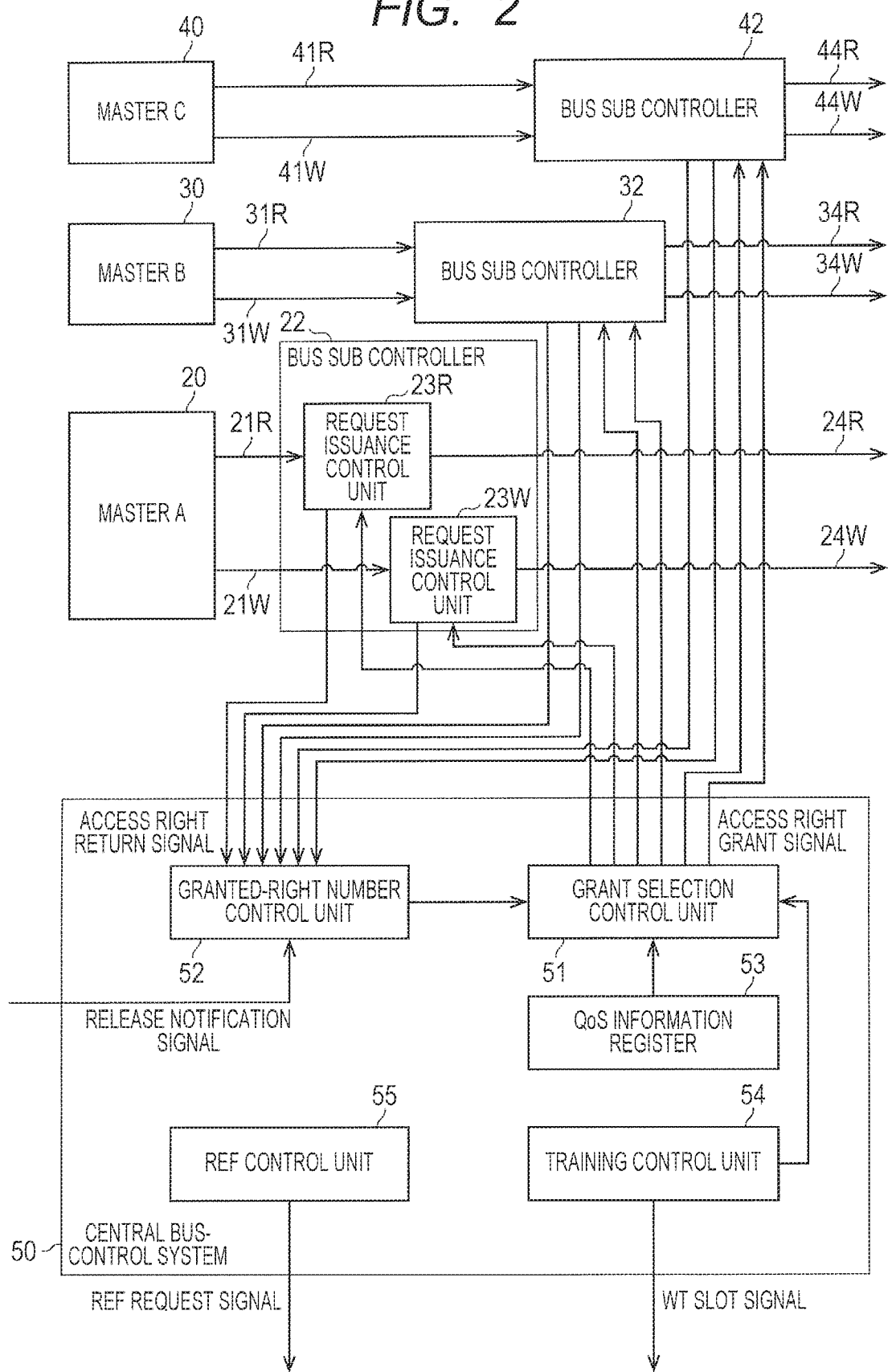

FIG. 3A MEMORY CLOCK 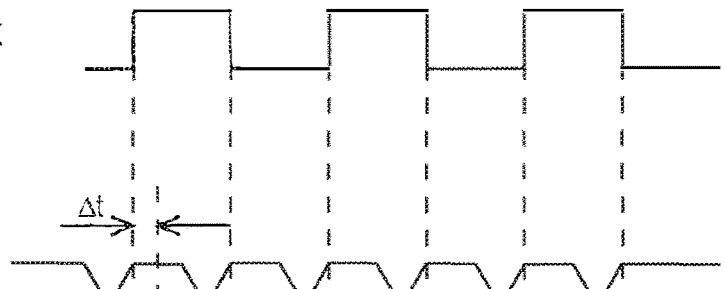
FIG. 3B DATA (BEFORE WT) 
FIG. 3C DATA (AFTER WT) 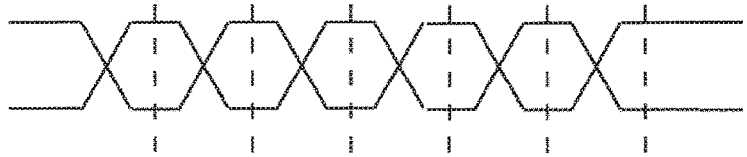
FIG. 4
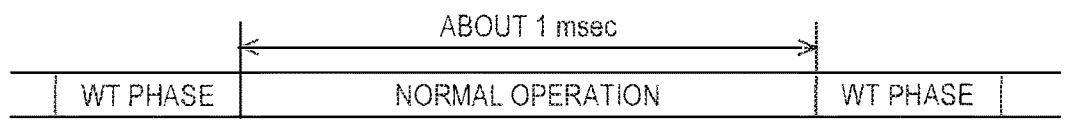

SEMICONDUCTOR DEVICE AND ACCESS CONTROL METHOD

CROSS-REFERENCE TO RELATED APPLICATIONS

This is a Continuation of U.S. patent application Ser. No. 16/000,659 filed on Jun. 5, 2018, which claims the benefit of Japanese Patent Application No. 2017-128728 filed on Jun. 30, 2017 including the specification, drawings and abstract are incorporated herein by reference in their entirety.

BACKGROUND

The present invention relates to a semiconductor device and an access control method and relates to, for example, a semiconductor device that accesses memory and an access control method in the semiconductor device.

WO2017/056132 discloses access control in a bus system where a plurality of bus masters is coupled to a common bus. A semiconductor device described in WO2017/056132 includes a plurality of masters, a memory controller, a bus that couples the masters and the memory controller, and a central bus-control system. WO2017/056132 describes that the central bus-control system monitors the traffic of each of the masters and selects one to be granted an access right from among the masters according to the reserved bandwidth of each of the masters, the monitored traffic, and the number of masters to be granted the right. In WO2017/056132, a request from the master not granted the access right is masked by a bus between the memory controller and the master.

Moreover, WO2017/056132 also describes bandwidth control in consideration of refresh of memory. In WO2017/056132, the central bus-control system outputs a refresh request signal to the memory controller and controls a refreshing operation of the memory. Specifically, in a basic slot including a plurality of sub slots, the central bus-control system outputs the refresh request signal at the sub slot having a specific number and performs a refreshing operation in the memory. In WO2017/056132, the central bus-control system reduces an overall requested bandwidth for the sub slot where memory access is disabled by refresh for a certain period. This achieves bandwidth control in consideration of refresh.

In recent writing and reading of data in memory, a timing margin between a clock and data becomes severe as an operating frequency increases. To address this problem, Japanese Unexamined Patent Application Publication No. 2011-150759 discloses a memory interface circuit including an inspection circuit that inspects skew between a data signal and a clock signal. The memory interface circuit described in Japanese Unexamined Patent Application Publication No. 2011-150759 requests a skew adjustment from a control circuit including a central processing unit (CPU) based on the result of the skew inspection.

SUMMARY

In WO2017/056132, access control is performed in consideration of refresh in the memory. In WO2017/056132, however, access control is not performed in consideration of skew adjustment or the like. As described in Japanese Unexamined Patent Application Publication No. 2011-150759, skew adjustment typically requires a relatively long time. During skew adjustment, data cannot be written or read in memory. Thus, access control has been demanded in consideration of skew adjustment or the like. Other problems and new features will be clarified by the description and the accompanying drawings of the present specification.

According to an embodiment, a semiconductor device includes an access control unit that controls the output of access requests to a memory controller after the access requests are issued by masters. The access control unit further controls training that is conducted in memory while access to the memory is stopped. During the execution of the training, the output of a read request to the memory controller is suppressed from among the access requests issued by the master.

According to the embodiment, even if training is conducted while memory access is stopped for a certain period, response to the access requests issued by the masters can be improved, achieving an advanced real-time property.

BRIEF DESCRIPTION OF THE DRAWINGS

FIG. 2 is a block diagram showing a part of the electronic device including a central bus-control system;

FIGS. 3A to 3C are timing charts showing timing adjustment between a clock signal and a data signal;

FIG. 4 is a diagram showing the operation modes of the central bus-control system;

DETAILED DESCRIPTION

Figure 1:
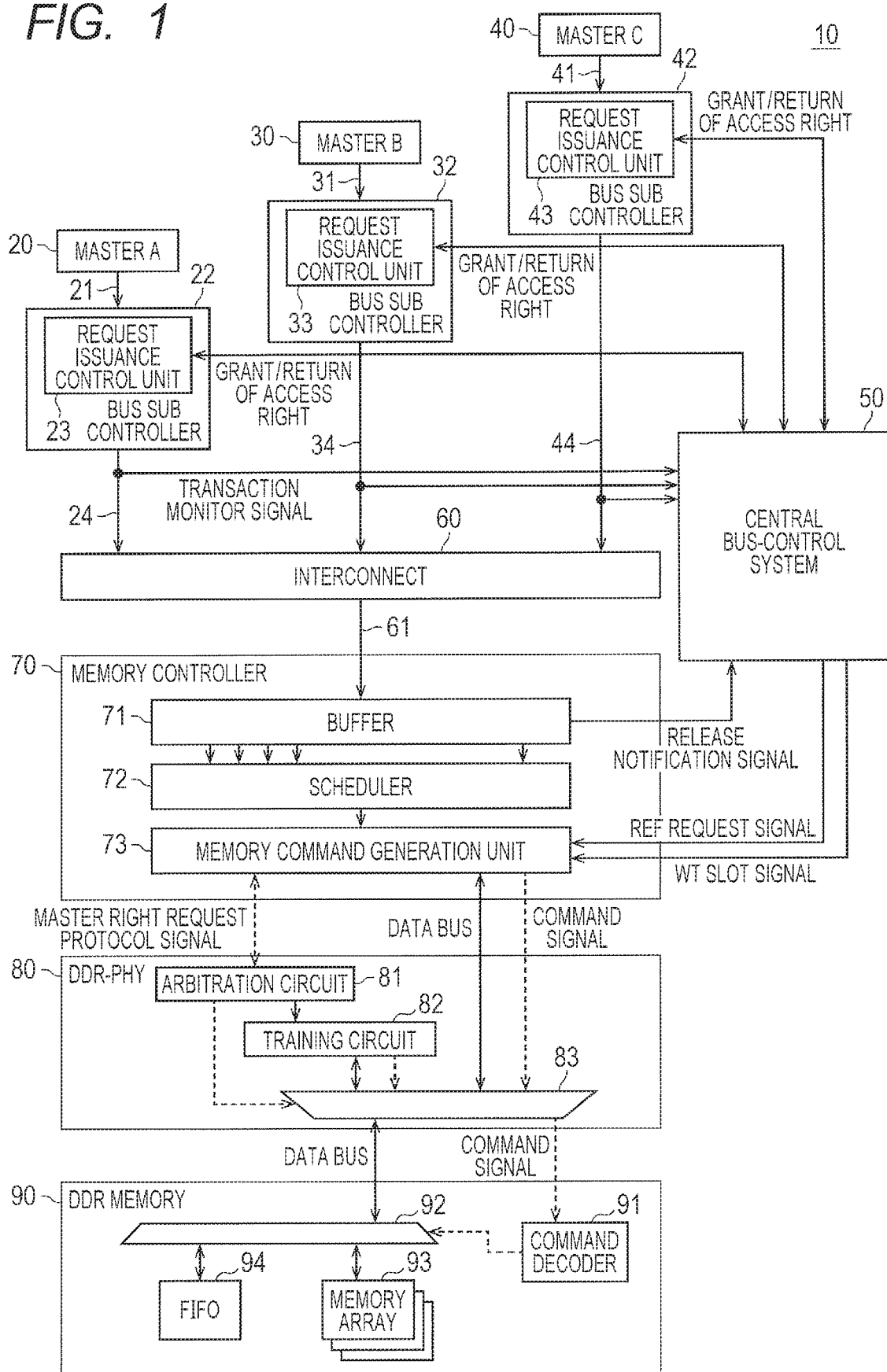
FIG. 1 is a block diagram showing an electronic device including a semiconductor device according to a first embodiment.

Prior to the explanation of embodiments, matters examined by the present inventors will be described below. Generally, systems for processing such as image display and video input require the assurance of a real-time property. In this case, the assurance of the real-time property means the assurance of response to, for example, an issued request within a specified time. If access is made to double-data-rate (DDR) memory during data processing in a system with an ensured real-time property, the real-time property needs to be ensured along with the access to the DDR memory. Unfortunately, the DDR memory used in such a system may have an insufficient memory band due to an increase in data amount to be processed, or the DDR memory may have low power consumption. Solutions to these problems have been demanded.

As a solution to the problems, low power DDR4 (LPDDR4) memory is available that is compliant with the standards of Joint Electron Device Engineering Council (JEDEC). The LPDDR4 memory requires a DDR write training operation in addition to ordinary data transfer and a refreshing operation. The DDR write training is training for adjusting timing (skew) between a clock signal and a data signal. During the DDR write training operation, access to DDR memory is prohibited. The execution time of the DDR write training is, for example, about 1 to 2 μsec.

In a real-time system where memory such as LPDDR4 memory is used for write training, the real-time property needs to be ensured in consideration of a time when data transfer is disabled during a write training period. Moreover, a bus system needs to be designed so as to reduce the influence of a write training operation on a memory band. In WO2017/056132, access is controlled in consideration of an access stop period resulting from a refreshing operation but an access stop period resulting from write training is not taken into consideration. The present inventors have found that the timing of write training is not recognized in the central bus-control system for controlling the grant of the access right in WO2017/056132 and the real-time property may not be ensured in the technique of WO2017/056132 because the memory access is stopped during a write training operation.

The embodiments including means for solving the problems will be specifically described below with reference to the accompanying drawings. To clarify the description, the following description and drawings are optionally omitted and simplified. Furthermore, elements described as functional blocks for various processing in the drawings can be configured with hardware including a central processing unit (CPU), memory, or other circuits and software including programs or the like loaded in memory. Thus, a person skilled in the art could understand that these functional blocks can be achieved in various forms, for example, by hardware alone, software alone, or a combination of hardware and software. The forms of functional blocks are not particularly limited. The same elements are indicated by the same reference numerals in the drawings and a redundant explanation is omitted when necessary.

Moreover, the programs can be stored using various kinds of nontemporary computer-readable media and supplied to computers. The nontemporary computer-readable media include various kinds of substantial recording media. The examples of the nontemporary computer-readable media include a magnetic recording medium (e.g., a flexible disk, a magnetic tape, and a hard disk), a magneto-optical recording medium (e.g., a magneto-optical disk), a CD-ROM (Read Only Memory), CD-R, CD-R/W, and semiconductor memory (e.g., mask ROM, programmable ROM (PROM), erasable PROM (EPROM), flash ROM, and random access memory (RAM)). The programs may be supplied to the computers by various kinds of nontemporary computer-readable media. The examples of the nontemporary computer-readable media include an electric signal, an optical signal, and an electromagnetic wave. The nontemporary computer-readable media can supply the programs to the computers through wire channels such as an electric wire and an optical fiber or radio channels.

For the convenience of explanation, a plurality of sections or the embodiments will be separately described in the following embodiments. The sections or embodiments are relevant to one another unless otherwise specified. One of the sections or embodiments is, for example, a modification, an application, a detailed explanation, and a supplementary explanation of some or all of the other sections or embodiments. In the following embodiments, the number of elements (including a number, a numeric value, an amount, and a range) is not limited to a specific number unless otherwise specified or clearly limited to the specific number in theory. Thus, the number of elements may be larger or smaller than the specific number.

Furthermore, the constituent elements (including operation steps) of the following embodiments are not always necessary unless otherwise specified and clearly required in theory. Similarly, the shapes and positional relationships of the constituent elements in the following embodiments substantially include the close or similar shapes of the constituent elements unless otherwise specified or clearly excluded in theory. This also holds for the number of elements (including a number, a numeric value, an amount, and a range).

[First Embodiment]

FIG. 1 shows an electronic device including a semiconductor device according to a first embodiment. An electronic device 10 includes a master A, a master B 30, a master C 40, bus sub controllers 22, 32, and 42, a central bus-control system 50, an interconnect 60, a memory controller 70, a PHY (physical layer interface) 80, and memory 90. From among the constituent elements of the electronic device 10, for example, the master A 20, the master B 30, the master C 40, the bus sub controllers 22, 32, and 42, the central bus-control system 50, the interconnect 60, the memory controller 70, and the PHY 80 constitute the semiconductor device. Moreover, from among the constituent elements of the semiconductor device, for example, the bus sub controllers 22, 32, and 42, the interconnect 60, the memory controller 70, and the PHY 80 can be configured as hardware circuits. The central bus-control system 50 can be configured as, for example, a circuit including a processor.

The master A 20, the master B 30, and the master C 40 issue access requests to the memory 90. The access requests to the memory 90 include a read request and a write request. The memory 90 is, for example, memory such as double-data-rate synchronous dynamic random access memory (DDR-SDRAM). In the following example, LPDDR4 memory is mainly used as the memory 90.

The master A 20, the master B 30, and the master C 40 are configured as, for example, processors for a CPU and a graphics processing unit (GPU) or the like. Priority may be set for the masters. For example, the master A 20 and the master B 30 is set at a higher priority than the master C 40. In the following explanation, the master A 20 and the master B 30 are masters where a real-time property needs to be ensured, whereas the master C 40 is a master where the real-time property does not need to be ensured.

The master A 20 is coupled to the corresponding bus sub controller 22 via a bus 21. The bus sub controller 22 is coupled to the interconnect 60 via a bus 24. The bus sub controller 22 includes a request issuance control unit 23. The request issuance control unit 23 controls the output of the access request to the bus 24, the access request being inputted through the bus 21. If an access right is granted to the request issuance control unit 23 from the central bus-control system 50, the access request issued by the master A 20 is outputted to the interconnect 60 through the bus 24 by the request issuance control unit 23. If the access right is not granted, the output of the access request issued by the master A 20 to the interconnect 60 is suppressed by the request issuance control unit 23.

The master B 30 is coupled to the corresponding bus sub controller 32 via a bus 31. The bus sub controller 32 is coupled to the interconnect 60 via a bus 34. The bus sub controller 32 includes a request issuance control unit 33. Likewise, the master C 40 is coupled to the corresponding bus sub controller 42 via a bus 41. The bus sub controller 42 is coupled to the interconnect 60 via a bus 44. The bus sub controller 42 includes a request issuance control unit 43. The functions of the request issuance control units 33 and 43 are similar to that of the request issuance control unit 23. If the access rights are granted and the access requests are not received from the respective masters, the request issuance control units 23, 33, and 43 may return the access rights to the central bus-control system 50.

Through the buses 24, 34, and 44, the interconnect 60 receives the access requests issued by the master A 20, the master B 30, and the master C 40. The interconnect 60 is, for example, a bus arbiter that arbitrates the access requests inputted from the masters and outputs the access requests to the memory controller 70 through a bus 61. For example, if the interconnect 60 receives the access requests from the master A 20, the master B 30, and the master C 40, the access request issued by the master placed on a high priority is outputted by the interconnect 60 to the memory controller 70 according to priorities set for the masters. When obtaining response to the access request outputted from the memory controller 70, the interconnect 60 selects the access request having the second highest priority and outputs the access request to the memory controller 70.

[Central Bus-Control System]

The central bus-control system 50 controls the output of the access requests, which are issued by the master A 20, the master B 30, and the master C 40, to the memory controller 70. The central bus-control system 50 constitutes an access control unit along with the bus sub controllers 22, 32, and 42. For example, a user sets the bands of the masters in advance in the central bus-control system 50 and ensures the quality of service (QoS) in a certain time (slot). The central bus-control system 50 grants the access rights to, for example, the bus sub controller 22, 32, and 42 according to the contents of predetermined access control. The contents of the predetermined access control under normal conditions may be similar to those described in, for example, WO2017/056132. The contents described in WO2017/056132 are cited as a reference in the present specification.

The central bus-control system 50 determines whether to grant the access rights to the bus sub controllers 22, 32, and 40 of the masters based on, for example, QoS information set for the masters. At this point, in response to transaction monitor signals acquired from the buses 24, 34, and 44, the central bus-control system 50 may monitor transactions passing through the interconnect 60. The central bus-control system 50 may grant the access rights while correcting each slot according to the traffic of transactions. Through the grant of the access rights, the central bus-control system 50 controls the output of the access requests, which are issued by the masters, to the memory controller 70.

FIG. 2 shows a part of the electronic device 10 including the central bus-control system 50. The central bus-control system 50 includes, for example, a grant selection control unit 51, a granted-right number control unit 52, a QoS information register 53, a training control unit 54, and a refresh control unit 55. In FIG. 2, the transaction monitor signal in FIG. 1 is omitted. In the following explanation, the grant selection control unit 51, the granted-right number control unit 52, and the QoS information register 53 will be mainly discussed and the operations of the training control unit 54 and the refresh control unit 55 will be discussed later.

The QoS information register 53 stores the QoS information on the masters. The granted-right number control unit 52 calculates the number of access rights that can be granted to the masters. For example, the granted-right number control unit 52 calculates the number of remaining access rights up to a maximum number of rights that can be granted to the masters. The maximum number is set in advance in a register or the like. The maximum number of rights is set equal to, for example, the number of access requests (capacity) that can be stored in a buffer 71 arranged in the memory controller 70. The granted-right number control unit 52 receives, from the buffer 71, a release notification signal that indicates the deletion of the access requests in the buffer 71, and then the granted-right number control unit 52 monitors free space information on the buffer 71. The granted-right number control unit 52 calculates the number of access rights that can be granted at present, up to the maximum number of granted rights based on the free space information on the buffer 71.

The grant selection control unit 51 determines (selects) the masters to be granted the access rights. For example, the grant selection control unit 51 determines the masters to be granted the access rights, within the number of rights that can be granted to the masters. The number of rights is calculated by the granted-right number control unit 52. The grant selection control unit 51 outputs an access-right granting signal, which indicates the acquisition of the access rights, to the bus sub controllers 22, 32, and 42 of the respective masters. For example, the grant selection control unit 51 asserts the access-right granting signal to be outputted to the bus sub controllers of the respective masters to be granted the access rights, and the grant selection control unit 51 continues negating the access-right granting signal to be outputted to the bus sub controllers of the respective masters not to be granted the access rights. The grant selection control unit 51 determines the masters to be granted the access rights, for each sub slot defined by dividing, for example, a certain time (slot) into a plurality of periods.

For example, the granted-right number control unit 52 subtracts the number of granted access rights from the maximum number of granted rights each time the grant selection control unit 51 grants the access rights, so that the number of remaining rights to be granted is calculated. The granted-right number control unit 52 increases the number of remaining rights according to the free space of the buffer each time the release notification signal is received from the buffer 71. The grant selection control unit 51 selects the masters to be granted the access rights, based on the QoS information on the masters and the number of remaining rights. At this point, within the range of the number of remaining rights, the grant selection control unit 51 may preferentially grant the access right to, for example, the master placed at a high priority level based on the QoS information. The grant selection control unit 51 may set traffic (bandwidth) in a predetermined period (sub slot) for each of the masters, and select the masters to be granted the access rights based on the traffic in the sub slot for each of the masters, the set bandwidth, and the number of remaining rights.

In the present embodiment, the buses 21 and 24 for the master A 20 include read request buses 21R and 24R for transmitting read requests and write request buses 21W and 24W for transmitting write requests. The bus sub controller 22 for the master A 20 includes a request issuance control unit 23R for the read request and a request issuance control unit 23W for the write request. Similarly, the buses 31 and 34 for the master B 30 include read request buses 31R and 34R for the read request and write request buses 31W and 34W for the write request. Moreover, the buses 41 and 44 for the master C 40 include read request buses 41R and 44R for the read request and write request buses 41W and 44W for the write request. Each of the bus sub controllers 32 and 42 for the master B 30 and the master C 40 also includes the request issuance control unit for the read request and the request issuance control unit for the write request, which are not shown in FIG. 2.

When receiving the access-right granting signal (if the access-right granting signal to be inputted is asserted), for example, the request issuance control units 23R and 23W output the read request and the write request to the read request bus 24R and the write request bus 24W for each sub slot. The grant selection control unit 51 can transmit the access-right granting signal to each of the request issuance control units 23R and 23W. When receiving the access-right granting signal, the request issuance control units 23R and 23W decide whether or not the read request and the write request have been outputted from the master A 20. If the request issuance control units 23R and 23W each receive the read request and the write request outputted from the master A 20 and the access-right granting signal, the request issuance control units 23R and 23W output the read request and the write request to the interconnect 60 through the read request bus 24R and the write request bus 24W. If the request issuance control units 23R and 23W do not receive the access-right granting signal but receive the read and write requests that are outputted from the master A 20, the read and write requests are suppressed in the request issuance control units 23R and 23W.

The grant selection control unit 51 transmits the access-right granting signal to, for example, both of the request issuance control units 23R and 23W of the bus sub controller 22 corresponding to the master A 20. Thus, the read and write requests issued by the master A 20 can be outputted to the memory controller 70. For example, the grant selection control unit 51 transmits the access-right granting signal only to the request issuance control unit 23W of the bus sub controller 22 and does not transmit the access-right granting signal to the request issuance control unit 23R. This can suppress the output of the read request issued by the master A 20 to the memory controller 70 while allowing the output of the write request issued by the master A 20 to the memory controller 70.

If the request issuance control units 23R and 23W receive the access-right granting signal but do not receive the read request and the write request outputted from the master A 20, the request issuance control units 23R and 23W each output an access right return signal to the granted-right number control unit 52 and return the access right to the central bus-control system 50. When receiving the access return signal, the granted-right number control unit 52 increases the number of rights that can be granted, according to the number of returned access rights. This allows the grant selection control unit 51 to grant the access rights to other masters. The operations of the request issuance control units in response to the read request and the write request in the bus sub controllers 32 and 42 are similar to the operations of the request issuance control units 23R and 23W.

[Memory Controller]

The memory controller 70 is coupled to the master A 20, the master B 30, and the master C 40 via the bus 61 and the interconnect 60 or the like. The memory controller 70 accesses the memory 90 in response to the access request outputted from the interconnect 60. In FIG. 1, the electronic device 10 has the three masters but the number of maters is not particularly limited. The electronic device 10 only needs a master for issuing, to the memory controller 70, the access request to the memory 90. If the number of masters is one, the interconnect 60 for arbitration is unnecessary.

The memory controller 70 includes the buffer 71, a scheduler 72, and a memory command generation unit 73. The buffer (request buffer) 71 stores the access requests received by the memory controller 70 through the interconnect 60. The buffer 71 is configured so as to store the access requests. The scheduler 72 selects one of the access requests stored in the buffer 71 and outputs the selected access request to the memory command generation unit 73. The scheduler 72 selects the access request according to, for example, predetermined criteria of selection and outputs the selected access request to the memory command generation unit 73.

The memory command generation unit 73 generates a memory command (command signal) for access to the memory 90 according to the access request outputted from the scheduler 72. The memory command generation unit 73 outputs the generated command signal to the PHY 80. If the access request is, for example, a read request, the memory command generation unit 73 generates a read command signal for reading data from the memory 90 and outputs the signal to the PHY 80. If the access request is, for example, a write request, the memory command generation unit 73 generates a write command signal for writing data in the memory 90 and outputs the signal to the PHY 80.

[PHY (DDR PHY)]

The PHY 80 constitutes a physical layer interface between the memory controller 70 and the memory 90. The memory controller 70 accesses the memory 90 through the PHY 80. The memory controller 70 transmits the read command signal to the memory 90 through, for example, the PHY 80 and retrieves data read from the memory 90 through the PHY 80. Moreover, the memory controller 70 transmits a write command to the memory 90 through the PHY 80 and then transmits written data to the memory 90 through the PHY 80. The PHY 80 and the memory controller 70 communicate with each other by using a predetermined protocol that is compliant with, for example, the DDR PHY Interface (DFI) specifications. The PHY 80 may be included in the memory controller 70 or may be configured as a different semiconductor device from the semiconductor device including the memory controller 70.

The PHY 80 includes an arbitration circuit 81, a training circuit 82, and a selector 83. The training circuit 82 conducts training on the memory 90. The training is conducted while access to the memory 90 is stopped. The training conducted by the training circuit 82 includes, for example, a skew adjustment between signals inputted to the memory 90. Specifically, the training includes write training (WT) for adjusting timing between a clock signal and a data signal inputted to the memory 90. In addition to or instead of WT, the training may include read training (RT) for adjusting timing between the clock signal and the data signal outputted from the memory 90. In the following explanation, write training will be mainly discussed as training.

The arbitration circuit 81 outputs a signal for requesting the acquisition of a control right for the memory 90 (master right request protocol signal), to the memory controller 70. Under normal conditions, the memory controller 70 has the control right for the memory 90. The memory controller 70 accesses the memory 90 through the PHY 80. When the acquisition of the control right is requested from the arbitration circuit 81, the memory controller 70 (memory command generation unit 73) sends a reply indicating permission to the arbitration circuit 81, thereby granting the control right to the PHY 80. When receiving the reply indicating the permission from the memory command generation unit 73, the arbitration circuit 81 acquires the control right for the memory 90 from the memory controller 70.

The selector 83 switches the coupling destination of a command signal and a data bus that are coupled to the memory 90, between the memory controller 70 and the training circuit 82. If the control right for the memory 90 is not acquired, the arbitration circuit 81 transmits, to the selector 83, a control signal for switching the coupling destination of the command signal and the data bus to the memory controller 70. When the control right for the memory 90 is acquired, the arbitration circuit 81 transmits, to the selector 83, a control signal for switching the coupling destination of the command signal and the data bus to the training circuit 82. If the PHY 80 acquires the control right for the memory 90, the training circuit 82 conducts training. If the PHY 80 has the control right for the memory 90, the memory controller 70 cannot access the memory 90. However, the memory controller 70 can issue some commands including a refresh command to the memory 90. [DDR memory]

The memory 90 includes a command decoder 91, a selector 92, a memory array 93, and a training first-in first-out (FIFO) 94. The memory array 93 stores data. The memory array 93 includes a plurality of storage cells arranged in a matrix. For example, the memory 90 includes multiple memory arrays 93. The command decoder 91 receives the command signal from the PHY 80 and issues various commands in the memory 90.

The selector 92 switches the coupling destination of the data bus coupled to the PHY 80, between the memory array 93 and the training FIFO 94. Under normal conditions, the command decoder 91 outputs, to the selector 92, the control signal for switching the coupling destination of the data bus to the memory array 93. When receiving the command signal indicating the execution of write training from the PHY 80, the command decoder 91 switches the coupling destination of the data bus to the training FIFO 94. The write training is performed using the training FIFO 94.

[Write Training]

FIGS. 3A to 3C shows a timing adjustment between the clock signal and the data signal in the memory 90. FIG. 3A shows the clock signal outputted from the PHY 80 to the memory 90. FIG. 3B shows the data signal before the write training. FIG. 3C shows the data signal after the write training. Referring to FIG. 3B, a time difference □t is made between the rising and falling edges of the clock signal and the center of the change point of the data signal before the write training. The time difference □t can be changed by varying, for example, a delay time provided for the clock signal or the data signal.

For example, the write training is conducted in the steps described below. The PHY 80 has a variable delay circuit that delays the clock signal. The training circuit 82 outputs predetermined test data to the memory 90 while changing a time for the clock signal. In the memory 90, the test data outputted by the training circuit 82 is stored in the training FIFO 94 at a time specified by the clock signal. The training circuit 82 reads the stored data from the training FIFO 94 and decides whether or not the read data matches the test data. In other words, the training circuit 82 decides whether or not the test data has been correctly written in the training FIFO 94.

While changing the delay time for the clock signal, the training circuit 82 writes the test data in the training FIFO 94 and determines the range of the delay time when the test data can be correctly written. For example, as a delay time for data writing in the memory 90, the training circuit 82 sets an intermediate delay time between the minimum value and the maximum value of the delay time when the test data can be correctly written. Thus, as shown in FIG. 3C, the rising and falling edges of the clock signal can be matched to the center of the change point of the data signal, thereby stably writing correct data in the memory arrays 93.

In the case of read training, the training circuit 82 reads training data stored in a register (not shown) included in the memory 90. The training circuit 82 changes a delay time for the clock signal outputted concurrently with the training data; meanwhile, the training circuit 82 determines the range of a delay time when the training data can be correctly read. For example, the training circuit 82 sets the intermediate delay time between the minimum value and the maximum value of the delay time when the test data can be correctly written, as a delay time for data writing in the memory 90. This can stably read correct data from the memory 90.

Returning to FIG. 1, in the present embodiment, the central bus-control system 50 also controls the execution (timing) of the write training. In the execution of the write training, the training control unit 54 (FIG. 2) of the central bus-control system 50 outputs a WT slot signal to the memory command generation unit 73 of the memory controller 70 and notifies the memory command generation unit 73 of the execution of the write training. The memory command generation unit 73 receives, from the arbitration circuit 81, a master right request protocol signal for requesting the control right for the memory 90. When receiving the WT slot signal from the training control unit 54, the memory command generation unit 73 transmits a reply indicating permission in response to the master right request protocol signal.

When the arbitration circuit 81 receives the replay indicating the permission, the PHY 80 acquires the control right for the memory 90 and the training circuit 82 conducts the write training. At the completion of the write training, the arbitration circuit 81 returns the control right to the memory controller 70. The return of the control right to the memory controller 70 allows the memory controller 70 to write and read data in the memory 90. After the control right is returned, the arbitration circuit 81 outputs the master right request protocol signal to the memory controller 70 and requests the acquisition of another control right. Thus, the PHY 80 can conduct write training with an acquired control right each time the central bus-control system 50 outputs the WT slot signal.

The training control unit 54 periodically outputs the WT slot signal and causes the training circuit 82 to periodically conduct the write training. The central bus-control system 50 includes, for example, a register for specifying the intervals of the write training. The training control unit 54 outputs the WT slot signal with a period corresponding to a value stored in the register. The register for specifying the intervals of the write training can be rewritten from the outside. The value of the register is rewritten using a CPU or the like (not shown), allowing an adjustment of the intervals of the write training.

In the present embodiment, the central bus-control system 50 controls access to the masters in consideration of the write training of the memory 90. During the write training, the grant selection control unit 51 (FIG. 2) of the central bus-control system 50 performs access control in a different way from normal conditions where write training is not conducted. As described above, according to the contents of predetermined access control, the grant selection control unit 51 under normal conditions selects the master to be granted the access right based on, for example, the QoS information on the masters and the number of remaining rights that can be granted. During the write training, the grant selection control unit 51 does not grant the access right in response to the read request from among the access requests issued by the masters. This suppresses the output of the read request to the memory controller 70. More specifically, the grant selection control unit 51 transmits the access-right granting signal to, for example, the request issuance control unit 23W of the bus sub controller 22 corresponding to the master A 20; meanwhile, the grant selection control unit 51 does not transmit the access-right granting signal to the request issuance control unit 23R. This suppresses the output of the read request to the memory controller 70. The grant selection control unit 51 may start suppressing the output of the read request at, for example, a predetermined time before the start of the write training.

In the present embodiment, the central bus-control system 50 (grant selection control unit 51) in particular suppresses the output of the read requests issued by the master A 20 and the master B, in which the real-time property needs to be ensured, to the memory controller 70 during the write training. During the write training, the central bus-control system 50 does not suppress the output of the write requests issued by the master A 20 and the master B 30, in which the real-time property needs to be ensured, to the memory controller 70. Moreover, the central bus-control system 50 during the write training suppresses the output of the read and write requests issued by the master C 40, in which the real-time property does not need to be ensured, to the memory controller 70. The kind of master, that is, whether the assurance of the real-time property is necessary or not is set by, for example, the register provided in the central bus-control system 50.

In the present embodiment, the central bus-control system 50 is configured so as to switch two operation modes. The first operation mode is the operation mode of a normal operation (normal operation mode) in which the write training is not conducted. The second operation mode is the operation mode of the write training (WT phase operation mode). In the normal operation mode, according to the contents of the predetermined access control, the central bus-control system 50 grants the access right in response to the access request issued by each of the masters. In the present embodiment, the normal operation mode and the WT phase operation mode are switched by, for example, the training control unit 54. For example, the training control unit 54 notifies the grant selection control unit 51 of switching to the WT phase operation mode and causes the grant selection control unit 51 to perform a write training operation.

In the WT phase operation mode, the training control unit 54 outputs the WT slot signal, causing the PHY 80 to conduct the write training. Moreover, in the WT phase operation mode, according to the contents of the predetermined access control, the grant selection control unit 51 grants the access right in response to the write request but does not grant the access right in response to the read request from among the access requests issued by the masters. For example, after switching from the normal operation mode to the WT phase operation mode, the grant selection control unit 51 stops the grant of the access right in response to the read request from among the access requests issued by the masters. After a lapse of a predetermined time from the stop of the grant of the access right, the grant selection control unit 51 outputs the WT slot signal, causing the PHY 80 to conduct the write training.

In the present embodiment, the grant selection control unit 51 in the WT phase operation mode grants the access right in response to the write request according to the contents of the predetermined access control but does not grant the access right in response to the read request particularly from among the access requests issued by the master A 20 and the master B 30 in which the real-time property needs to be ensured. Moreover, the grant selection control unit 51 does not grant the access right in response to the read and write requests issued by the master C 40 in which the real-time property does not need to be ensured.

The central bus-control system 50 (training control unit 54) periodically switches the operation mode from the normal operation mode to the WT phase operation mode. FIG. 4 shows the switching of the operation modes. The central bus-control system 50 operates in the WT phase operation mode and then switches the operation mode to the normal operation mode. For example, after a lapse of a predetermined time from the switching to the normal operation mode, the central bus-control system 50 switches the operation mode to the WT phase operation mode, allowing the execution of the write training. The central bus-control system 50 switches the operation mode to the WT phase mode, for example, after a lapse of about 1 msec from the switching to the normal operation mode. In this case, the write training can be periodically conducted at intervals of about 1 msec. The operation modes do not always need to be strictly switched at regular intervals as long as the operation modes are periodically switched.

The central bus-control system 50 may control a refreshing operation (and the timing thereof) in the memory 90 in addition to the control of the write training. In the case of a refreshing operation, the refresh control unit 55 (FIG. 2) outputs a refresh request signal to the memory command generation unit 73 (FIG. 1) of the memory controller 70. The refresh control unit 55 periodically outputs the refresh request signal so as to satisfy time intervals defined by, for example, the JED EC standards. When receiving the refresh request signal, the memory command generation unit 73 outputs a command signal indicating the execution of refresh to the memory 90. When receiving the command signal indicating the execution of refresh, the memory 90 refreshes the memory arrays 93.

If a refreshing operation is performed in the memory 90, the central bus-control system 50 may control access in consideration of refresh in the memory. The access control performed in consideration of the refresh of the memory may be similar to that described in WO2017/056132. In the present embodiment, the central bus-control system 50 does not always need to control a refreshing operation and does not always need to control access in consideration of refresh. In this case, the refresh control unit may be omitted. A refreshing operation may be controlled by a control unit different from the central bus-control system 50.

[Operation Example]

Figure 5:
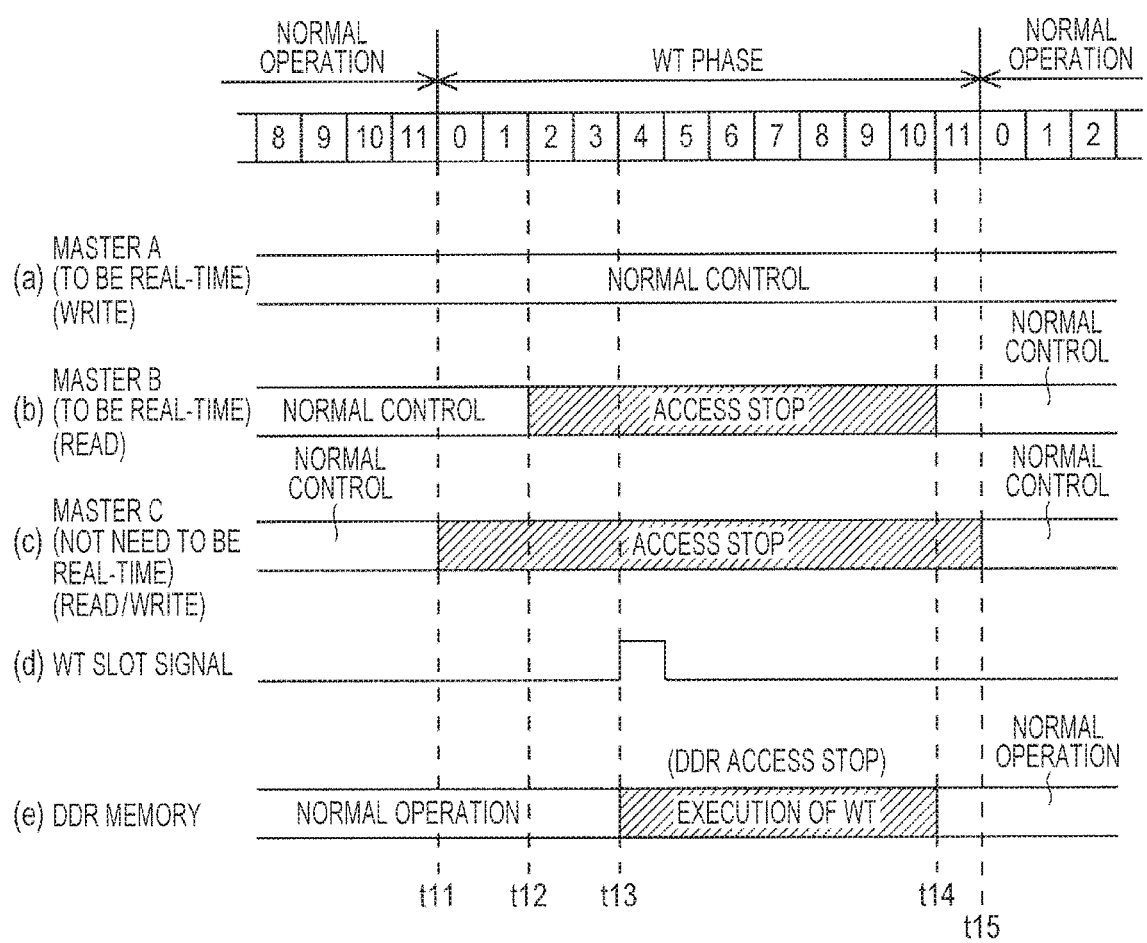
FIG. 5 is a timing chart showing the operating waveforms of units during write training.

An operation example will be described below. FIG. 5 shows the operating waveforms of the units during the write training. In the following example, the duration of a period for the execution of the write training (WT phase) corresponds to twelve slots (sub slots). Each of the masters A 20 and B 30 can actually issue both of the read and write requests. However, for simplicity, the master A 20 issues the write request and the master B 30 issues the read request in the following explanation.

At time t11, the central bus-control system 50 switches the operation mode to the WT phase operation mode. At time t11 when the operation modes are switched, the central bus-control system 50 suppresses the output of the read and write requests from the master C 40 (See (c)), in which the real-time property does not need to be ensured, to the memory controller 70 prior to the output of the WT slot signal (See (d)). More specifically, the central bus-control system 50 stops granting the access right to the request issuance control unit 43 corresponding to the master C 40, preventing the memory controller 70 from receiving the read and write request issued by the master C 40.

At time t12 after a lapse of a time equivalent to two slots from time t11, the central bus-control system 50 suppresses the output of the read request of the master B 30, in which the real-time property needs to be ensured, to the memory controller 70 (See (b)). More specifically, for the request issuance control unit 33 corresponding to the master B 30, the central bus-control system 50 stops the grant of the access right in response to the read request, preventing the memory controller 70 from receiving the read request issued by the master B 30. The output of the read request of the master B 30 to the memory controller 70 is suppressed before the WT slot signal is outputted. At time t13 after a lapse of a time equivalent to two slots from time t11, the central bus-control system 50 outputs (asserts) the WT slot signal to the memory controller 70, causing the PHY 80 to conduct the write training of the memory 90 (See (d) and (e)). In the period of the write training, the data bus of the memory 90 is used for transmitting and receiving the test data to be outputted, preventing the memory controller 70 from writing and reading data in the memory 90. In the period of the write training, the central bus-control system 50 grants the access right only in response to the write request issued by the master A 20, in which the real-time property needs to be ensured (See (a)).

After the completion of the write training operation, at time t14, the central bus-control system 50 releases the output of the read request of the master B 30, in which the real-time property needs to be ensured, to the memory controller 70 (See (b)). At time t14, for the request issuance control unit 33 corresponding to the master B 30, the central bus-control system 50 releases the grant of the access right in response to the read request. Thus, from time t14, the read request issued by the master B 30 can be outputted to the memory controller 70.

At time t15 after a lapse of a time equivalent to one slot from time t14, the central bus-control system 50 switches the operation mode from the WT phase operation mode to the normal operation mode, releasing the output of the read and write requests of the master C 40, in which the real-time property does not need to be ensured, to the memory controller 70 (See (c)). At time t15, the central bus-control system 50 releases the grant of the access right to the request issuance control unit 43 corresponding to the master C 40. The operation mode is switched to the normal operation mode, so that the access rights are granted to the masters according to the contents of normal access control.

As shown in FIG. 5, before the start of the write training and at a predetermined time (time t11) from a time (time t13) when the write training is started, the central bus-control system 50 starts the suppression of the output of the read and write requests issued by the master C 40. In this case, from time t11 to time t12, only the write request issued by the master A 20 and the read request issued by the master B 30 are outputted as access requests to the memory controller 70. Before the write training, the read and write requests issued by the master C 40, in which the real-time property does not need to be ensured, are suppressed preceding the memory controller 70. Thus, the memory controller 70 can more frequently receive the access requests issued by the master A 20 and the master B 30, in which the real-time property needs to be ensured.

Before the start of the write training and at the time (time t12) after the start of the suppression of the read and write requests issued by the master C 40 (time t11), the central bus-control system 50 starts the suppression of the output of the read request issued by the master B 30. In this case, from time t11 to time t12, only the write request issued by the master A 20 is received by the memory controller 70 and is stored in the buffer 71. In a state in which the reception of another read request is suppressed by the central bus-control system 50, the memory controller 70 reads data from the memory 90 in response to the read request stored in the buffer 71. Thus, the processing of the read request stored in the buffer 71 can be completed before the execution of the write training. Moreover, the memory controller 70 writes write data in the memory 90 according to the write request stored in the buffer 71 and the write data. After the output of the read request of the master B 30 is suppressed, a time for memory access based on the access request stored in the buffer 71 is provided before the start of the write training. Thus, the buffer 71 can be made empty before the start of the write training.

During the write training, the central bus-control system 50 grants the access right only in response to the write request issued by the master A 20 and the memory controller 70 receives only the write request of the master A 20. During the write training, the memory controller 70 cannot access the memory 90 and the write request of the master A 20 is stored in the buffer 71. At this point, when viewed from the master A 20 having issued the write request, the write data is written in the memory 90 at the time of the storage of the write request in the buffer 71, allowing write access during the write training as in a normal operation. Unlike during reading, the memory controller 70 can return a reply in response to the write request when the write request is stored in the buffer 71. When the master A 20 receives the reply from the memory controller 70, the process can advance to subsequent processing before the data is actually written in the memory 90.

After the completion of the write training, the central bus-control system 50 at that time (time t14) first releases the output of the read request issued by the master B 30. Then, at a subsequent time (time t15), the central bus-control system 50 releases the output of the read and write requests issued by the master C 40. After the completion of the write training, the access right is preferentially granted in response to the read request issued by the master B 30, in which the real-time property needs to be ensured. Thus, the read request issued by the master B 30 can be preferentially processed by the memory controller 70, thereby ensuring the real-time property.

[Conclusion]

In the present embodiment, the central bus-control system 50 controls the write training of the memory 90 in addition to the control of the output of the access requests issued by the masters to the memory controller 70 (access control). If the central bus-control system 50 controls the write training, the central bus-control system 50 can recognize the timing of the write training, enabling access control in consideration of a memory access stop period set by the write training. In the present embodiment, in particular, the central bus-control system 50 suppresses the output of the read request to the memory controller from among the access requests issued by the masters during the write training.

As described above, the master can receive a reply in response to the write request when the memory controller 70 receives the write request. Thus, even during the write training, if there is free space in the buffer 71 of the memory controller 70, the master can advance to the subsequent processing before data is actually written in the memory 90. As for the read request, access to the memory 90 is stopped and read data cannot be acquired during the write training. Thus, the master cannot obtain a reply in response to the read request until the end of the write training.

In the present embodiment, the characteristics of the read request and the write request are used. The memory controller 70 does not receive the read request during the write training. The memory controller 70 stores the write request in the buffer 71 during the write training. This allows the master to make write access as in normal conditions and improves response to the write request so as to ensure the real-time property.

In the present embodiment, the central bus-control system 50 periodically conducts the write training at, for example, the intervals of several msec. It is considered that a write training time depends on the write training intervals. The larger the write training intervals, the larger the time lag between the clock signal and the data signal, thereby extending the write training time. Variations in write training time also increase. In the present embodiment, the central bus-control system 50 periodically conducts write training at, for example, the intervals of several msec. This can achieve a uniformly short write training time.

In the related art of, for example, Japanese Unexamined Patent Application Publication No. 2011-150759, training such as write training is conducted under software control by the control circuit of a CPU and the like. The write training conducted by software seems hard to periodically control at, for example, the intervals of 1 msec in consideration of other processing. Thus, the intervals of the write training cannot be extremely shortened, leading to an extended write training time. The extended write training time reduces the number of requests to be processed with the real-time property, making it difficult to ensure the real-time property. In the present embodiment, the write training can be periodically conducted at short intervals by using the training circuit 82 provided in the PHY 80 and the central bus-control system 50. Thus, the real-time property can be more easily ensured than in the related art.

[Second Embodiment]

A second embodiment will be described below. The configuration of an electronic device according to the present embodiment is identical to that of the electronic device according to the first embodiment shown in FIG. 1. The present embodiment is different from the first embodiment mainly in that refresh is performed when a central bus-control system conducts write training. Other points may be similar to those of the first embodiment.

In the present embodiment, a central bus-control system 50 controls a refreshing operation so as to perform refresh concurrently with the write training of memory 90. When an operation mode is switched to a WT phase operation mode, a training control unit 54 (FIG. 2) of the central bus-control system 50 notifies a refresh control unit 55 of the switching of the operation mode. In addition to the output of a normal refresh request signal, the refresh control unit 55 (FIG. 2) outputs a refresh request signal to a memory controller 70, for example, at the start of the write training, allowing a refreshing operation. Moreover, at the completion of the write training, the refresh control unit 55 outputs the refresh request signal to the memory controller 70, allowing a refreshing operation.

[Operation Example]

Figure 6:
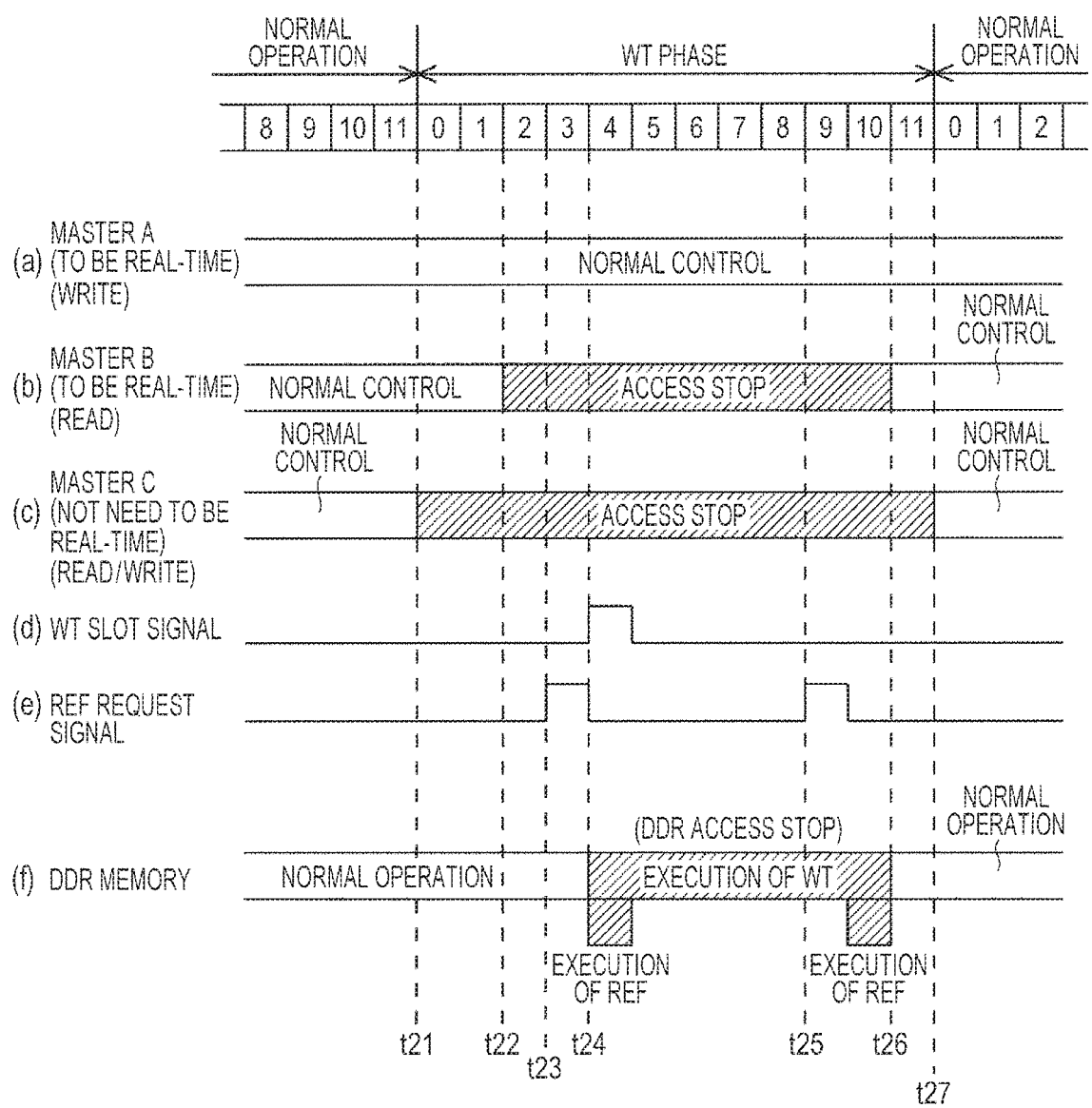
FIG. 6 is a timing chart showing the operating waveforms of units during write training according to a second embodiment.

An operation example will be discussed below. FIG. 6 shows the operating waveforms of units during the write training according to the second embodiment. The operating waveforms are different from the operation waveforms in FIG. 5 according to the first embodiment mainly in that the refresh request signal is added (See (e)). Operations until time t22 are similar to those until time t12 in FIG. 5. Specifically, at time t21, the central bus-control system 50 suppresses the output of the read and write requests of a master C 40, in which a real-time property does not need to be ensured, to the memory controller 70 (See (c)). At time t22, the central bus-control system 50 suppresses the output of the read request of a master B 30, in which the real-time property needs to be ensured, to the memory controller 70 (See (b)).

At time t23 after the output of the read request of the master B 30 is suppressed, the central bus-control system 50 outputs (asserts) the refresh request signal to a memory command generation unit 73 of the memory controller 70 (See (e)). When receiving the refresh request signal, the memory command generation unit 73 generates a command signal for performing the refreshing operation in the memory 90. The memory command generation unit 73 outputs the generated command signal to the memory 90 through a PHY 80.

Subsequently, at time t24, the central bus-control system 50 outputs a WT slot signal to the memory controller 70, causing the PHY 80 to conduct the write training on the memory 90 (See (d) and (f)). At this point, the refreshing operation is also performed in the memory 90. In FIG. 6, a write training operation and a refreshing operation are simultaneously started at time t24. These operations are not always started completely at the same time. In a write training period, the central bus-control system 50 grants an access right only in response to a write request issued by a master A 20, in which the real-time property needs to be ensured (See (a)).

Then, before the completion of the write training, the central bus-control system 50 outputs the refresh request signal again to the memory command generation unit 73 (See (e)). When receiving the refresh request signal, the memory command generation unit 73 outputs the command signal for performing the refreshing operation, to the memory 90 through the PHY 80. The memory 90 performs the refreshing operation in response to the command signal (See (f)). The second timing (at time t25) of the output of the refresh request signal in a WT phase is determined based on, for example, an estimated write training time (equivalent to a time from time t24 to time t26) and a refreshing time.

An operation at the completion of the write training may be similar to that described in the first embodiment shown in FIG. 5. At time t26, the central bus-control system 50 first releases the output of the read request issued by the master B 30 and then at time t27, the central bus-control system 50 releases the output of the read and write requests issued by the master C 40. After the output of the refresh request signal at time t25, the central bus-control system 50 calculates the timing of the output of a subsequent refresh request signal in a normal operation relative to time t25.

[Conclusion]

In the present embodiment, the central bus-control system 50 outputs the refresh request signal according to the execution of the write training, and the write training operation and the refreshing operation are simultaneously performed in the memory 90. The write training operation and the refreshing operation are performed while access to memory arrays 93 is stopped. The two operations are simultaneously performed while memory access is stopped, so that the stop of memory access during the refreshing operation can be concealed by the stop of memory access stop during the write training operation. This can reduce the access stop period of the memory 90 so as to improve an access band. The assurance of the real-time property increases with the number of access bands of the memory 90.

In the present embodiment, the central bus-control system 50 outputs the refresh request signal at the completion of the write training. For example, in the case of LPDDR4 memory, refresh is performed at intervals of about 2 to 4 μsec. In the case of a write training time of, for example, about 1 to 2 μsec, refresh is performed at the stop time of the write training while memory access is stopped, thereby delaying a subsequent refreshing time as compared with the case where refresh is not performed at the stop time. Refresh is performed at the completion of the write training, so that in a normal operation of the write training, the influence of the refresh on the memory access can be minimized in the normal operation.

[Third Embodiment]

A third embodiment will be described below. In the first and second embodiments, the central bus-control system 50 controls (schedules) the output of the read and write requests to the memory controller 70 in the WT phase operation mode. In the WT phase, however, memory access in the memory 90 in response to any one of the access requests is finally controlled by the scheduler 72 of the memory controller 70. The scheduler 72 operates separately from the central bus-control system 50. The central bus-control system 50 can control the access request received by the memory controller 70 but cannot control scheduling of the access requests stored in the buffer 71.

Specifically, in the WT phase, the central bus-control system 50 stops the grant of the access right in response to the read and write requests of the master C 40, in which the real-time property does not need to be ensured, at time t11 in FIG. 5. The central bus-control system 50 stops the grant of the access right at time t12 in response to the read request of the master B 30, in which the real-time property needs to be ensured. Thus, in a period from time t11 to time t12, the read request of the master B 30 is preferentially received by the memory controller 70. However, even if the read request of the master B 30 is to be preferentially processed by the central bus-control system 50, the scheduler 72 may first process the write request through normal scheduling. In this case, at time t13 when the write training is started, the read request of the master B 30 may be left in the buffer 71 without being processed. This problem is solved by the present embodiment.

Figure 7:
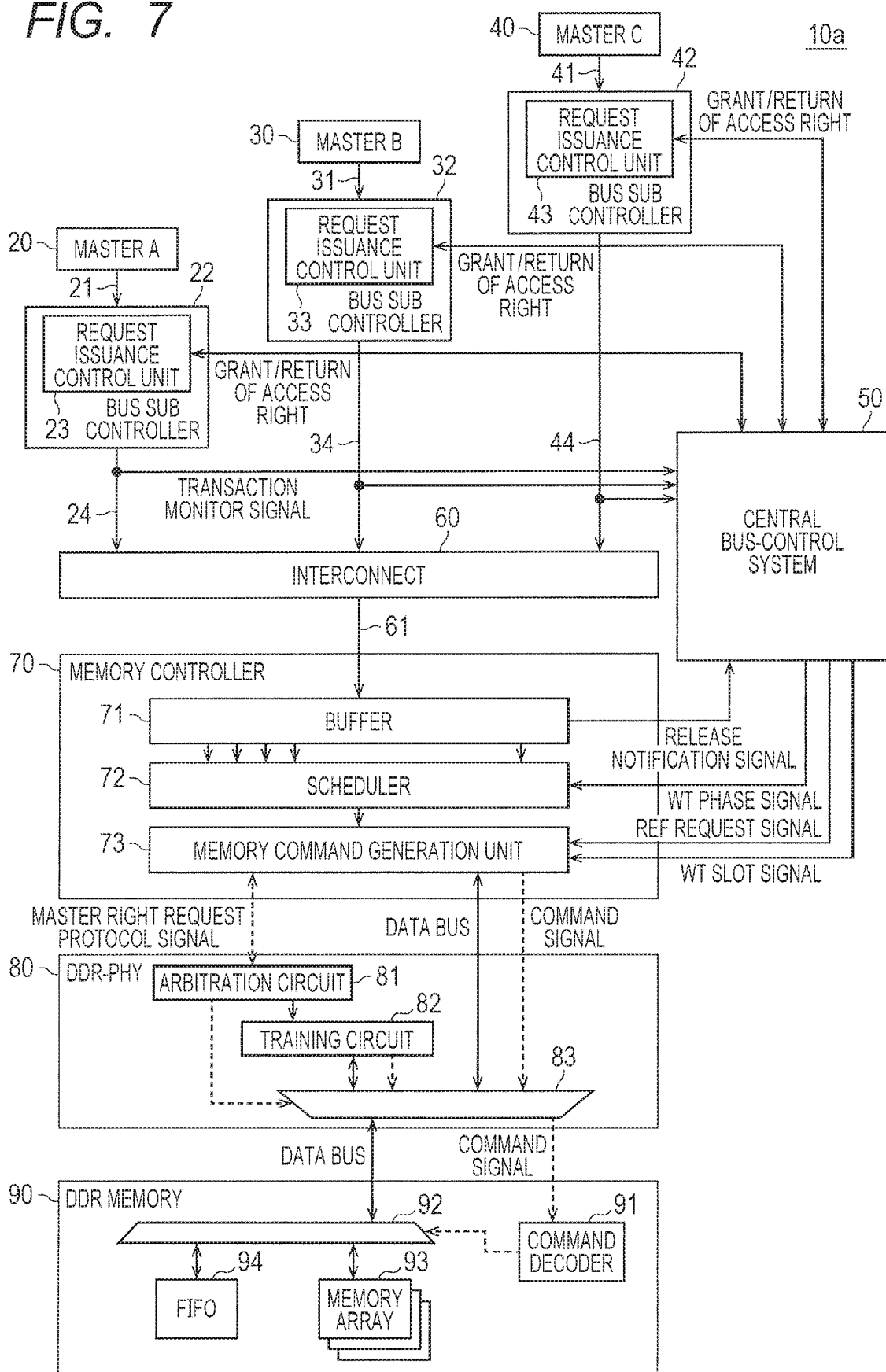
FIG. 7 is a block diagram showing an electronic device including a semiconductor device according to a third embodiment.

FIG. 7 shows an electronic device including a semiconductor device according to the third embodiment. An electronic device 10a according to the present embodiment is different from the electronic device 10 according to the first embodiment in FIG. 1 mainly in that a central bus-control system 50 outputs a WT phase signal (training phase signal) to a scheduler 72 of a memory controller 70. In the present embodiment, the scheduler 72 performs scheduling in consideration of write training. Other points may be similar to those of the first or second embodiment.

In the present embodiment, the central bus-control system 50 outputs the WT phase signal to the memory controller 70 before the start of the write training, the WT phase signal indicating a period associated with the execution of the training. For example, when an operation mode is switched from a normal operation mode to a WT phase operation mode, the central bus-control system 50 outputs (asserts) the WT phase signal to the memory controller 70. When the WT phase signal is outputted, the central bus-control system 50 starts the suppression of the output of a read request issued by a master after a lapse of a predetermined time.

While the WT phase signal is outputted, the scheduler 72 preferentially selects the read request from among access requests stored in a buffer 71. The scheduler 72 supposed to preferentially select the read request selects a write request in the absence of the read request in the buffer 71. If the output of the read request is released after the completion of the write training, after a lapse of a certain time, the central bus-control system 50 stops (negates) the WT phase signal to be outputted to the memory controller 70. Until the WT phase signal is negated, the scheduler 72 preferentially selects the read request from among access requests stored in the buffer 71.

[Operation Example]

Figure 8:
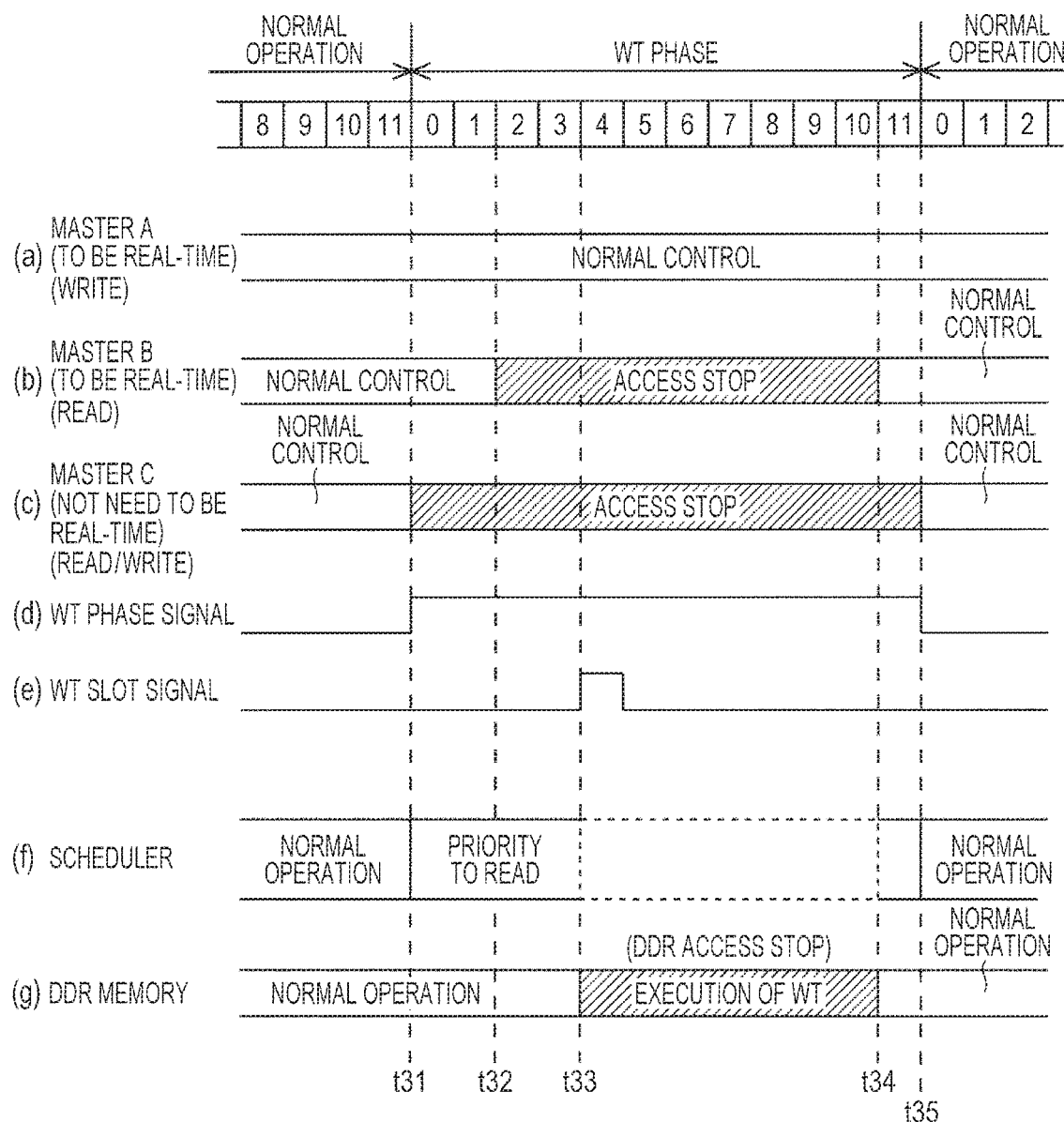
FIG. 8 is a timing chart showing the operating waveforms of units during write training according to the third embodiment.

An operation example will be described below. FIG. 8 shows the operating waveforms of units during the write training according to the third embodiment. The operating waveforms are different from those in FIG. 5 of the first embodiment mainly in that the WT phase signal (See (d)) and the operation of the scheduler (See (f)) are added. At time t31, the central bus-control system 50 switches the operation mode to the WT phase operation mode and outputs (asserts) the WT phase signal to the scheduler 72 of the memory controller 70 (See (d)). Moreover, at time t31, the central bus-control system 50 suppresses the output of the read and write requests of a master C 40, in which the real-time property does not need to be ensured, to the memory controller 70 (See (c)).

When the WT phase signal is asserted, the scheduler 72 preferentially selects the read request from among the access requests stored in the buffer 71 (See (f)) and then outputs the read request to a memory command generation unit 73. Thus, the read request of a master B 30 is preferentially selected and processed in the memory controller 70 after being preferentially received by the memory controller 70 under the control of the central bus-control system 50.

At time t32, the central bus-control system 50 suppresses the output of the read request of the master B 30, in which the real-time property needs to be ensured, to the memory controller 70 (See (b)). In this case, until no read requests are left to be selected, the scheduler 72 preferentially selects the read request from among the read requests stored in the buffer 71. When no read requests are left to be selected, the scheduler 72 selects the write request. This can minimize the number of access requests stored in the buffer 71 before the start of the write training to be stopped in memory access.

At time t33, the central bus-control system 50 outputs a WT slot signal to the memory controller 70 and causes a PHY 80 to conduct the write training of memory 90 (See (e) and (g)). The central bus-control system 50 grants the access right only in response to the write request issued by a master A 20, in which the real-time property needs to be ensured, during a write training period (See (a)). The write request issued by the master A 20 is stored in the buffer 71 of the memory controller 70. During the write training, only the write request issued by the master A 20 is additionally stored in the buffer 71. Since access to the memory 90 is stopped during the write training, the operation of the scheduler 72 is substantially stopped. In this period, memory access is not made in response to the write request stored in the buffer 71.

After the completion of a write training operation, at time t34, the central bus-control system 50 releases the output of the read request of the master B 30, in which the real-time property needs to be ensured, to the memory controller 70 (See (b)). Then, at time t35, the central bus-control system 50 switches the operation mode from the WT phase operation mode to the normal operation mode and negates the WT phase signal (See (d)). Moreover, at time t35, the central bus-control system 50 releases the output of the read and write requests of the master C 40, in which the real-time property does not need to be ensured, to the memory controller 70 (See (c)).

After the completion of the write training, the scheduler 72 preferentially selects the read request in a period during which the WT phase signal is asserted. If the read request issued by the master B 30 from time t34 to time t35 is received by the memory controller 70 and is stored in the buffer 71, the read request is preferentially selected and processed.

In this case, the write request issued by the master A 20 during the write training is stored in the buffer 71. At time t33 when the write training is completed, the buffer 71 may not have free space. In this case, the scheduler 72 selects one of write requests stored in the buffer 71. After the write request is processed, the scheduler 72 deletes the write request from the buffer 71. Then, when a read request is stored in the buffer 71, the scheduler 72 preferentially selects the read request. This can preferentially process the read request issued by the master where the grant of access right is stopped.

[Conclusion]

In the present embodiment, the central bus-control system 50 outputs the WT phase signal to the scheduler 72 of the memory controller 70 and notifies the scheduler 72 of a WT phase. The scheduler 72 in the WT phase performs scheduling for access control in consideration of the write training performed by the central bus-control system 50. In this way, in the WT phase, the present embodiment can coordinate control (scheduling) performed by the central bus-control system 50 on the read and write requests outputted to the memory controller 70 and the scheduling of the read and write requests in the memory controller 70. The central bus-control system and the memory controller 70 are operated in a coordinated fashion, thereby improving the assurance of the real-time property as compared with the first and second embodiments.

Specifically, in the present embodiment, the scheduler 72 places higher priority on the read request in coordination with the central bus-control system 50 before the write training, thereby preferentially processing the read request. The read request is preferentially processed before the write training, thereby preventing the read access from being unfinished before the write training and preventing a reply to the read request after the write training. In the present embodiment, the read request is processed before the write training, thereby improving the assurance of the real-time property.

In the present embodiment, the read request is preferentially processed before the write training. The read request has been processed at the start of the write training. In the present embodiment, no read requests are left in the buffer 71 during the write training, thereby increasing the number of write requests that can be stored in the buffer 71 during the write training. This means that a throughput in a period of time can be increased so as to improve real-time processing. In other words, this means that sufficient real-time processing can more reliably ensure the real-time property.

In the present embodiment, in a period during which the WT phase signal is asserted after the write training, the scheduler 72 preferentially selects the read request issued by the master where the grant of the access right is stopped during the write training, instead of the write request left in the buffer 71. Thus, the access right is not acquired during the write training and the read request can be preferentially processed nearly at the end of the allowed time of real-time processing, thereby improving the assurance of the real-time property.

[First Modification]

Figure 9:
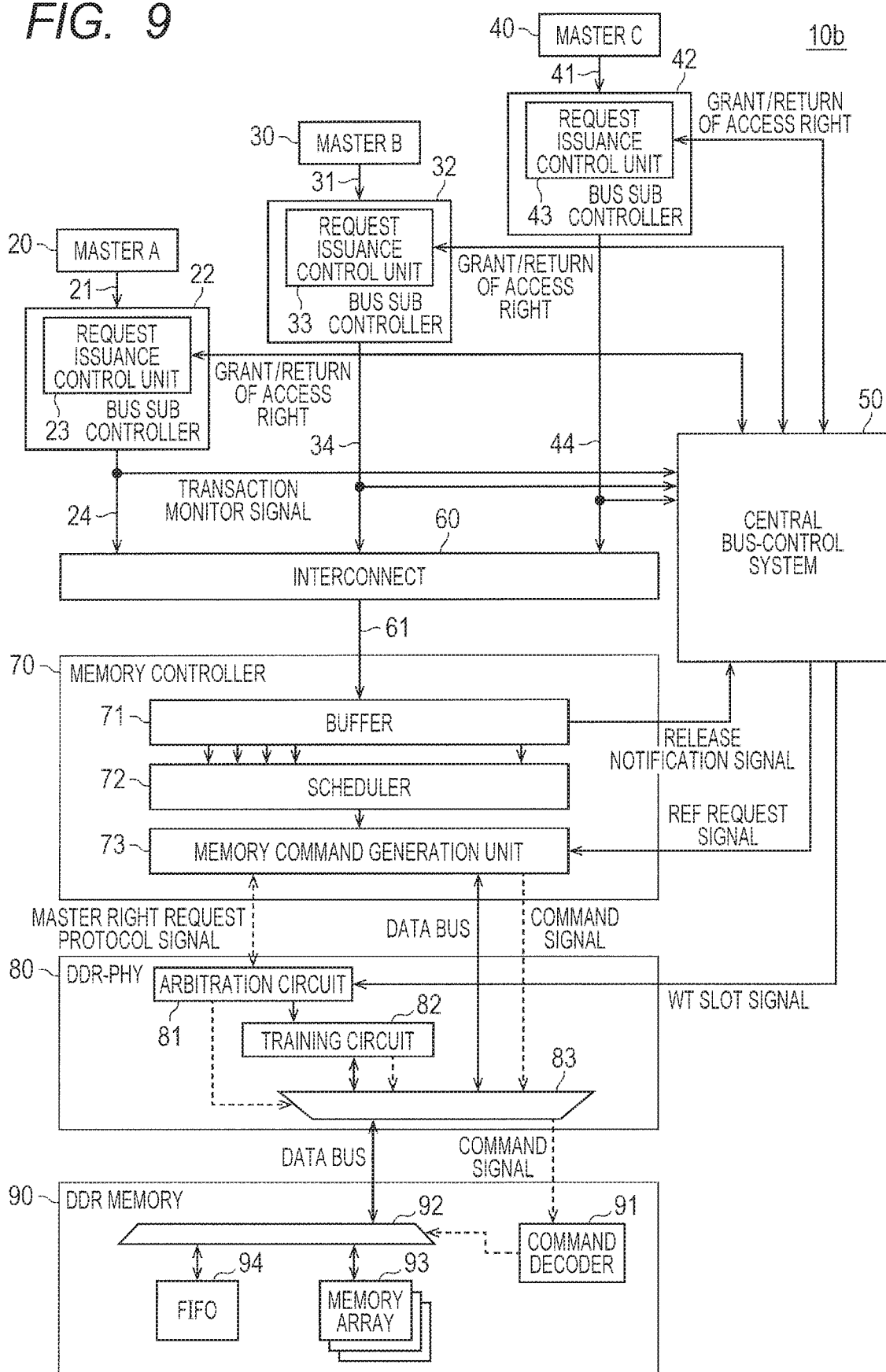
FIG. 9 is a block diagram showing an electronic device including a semiconductor device according to a first modification.

A first modification will be discussed below. FIG. 9 shows an electronic device including a semiconductor device according to the first modification. An electronic device 10b according to the present modification is different from the electronic device 10 according to the first embodiment in FIG. 1 mainly in that a central bus-control system 50 outputs a WT slot signal to an arbitration circuit 81 of a PHY 80. Other points may be similar to those of the first, second, or third embodiment.

In the present modification, a training control unit 54 (FIG. 2) of the central bus-control system 50 outputs the WT slot signal to the arbitration circuit 81 and notifies the arbitration circuit 81 of the execution of the training. When receiving the WT slot signal from the training control unit 54, the arbitration circuit 81 outputs a master right request protocol signal, which requests the acquisition of the control right of the memory 90, to a memory command generation unit 73 of a memory controller 70. When receiving the master right request protocol signal, the memory command generation unit 73 returns a reply indicating permission to the arbitration circuit 81.

In the present embodiment, the central bus-control system 50 outputs the WT slot signal to the PHY 80. When receiving the WT slot signal, the PHY 80 requests the acquisition of the control right from the memory controller 70 and conducts write training. In the first, second, and third embodiments, the arbitration circuit 81 of the PHY 80 needs to request the acquisition of the control right from the memory controller 70 before the write training. In the present embodiment, the arbitration circuit 81 only needs to request the acquisition of the control right when the WT slot signal is outputted, eliminating the need for requesting the acquisition of the control right from the memory controller 70 at all times.

[Second Modification]

Figure 10:
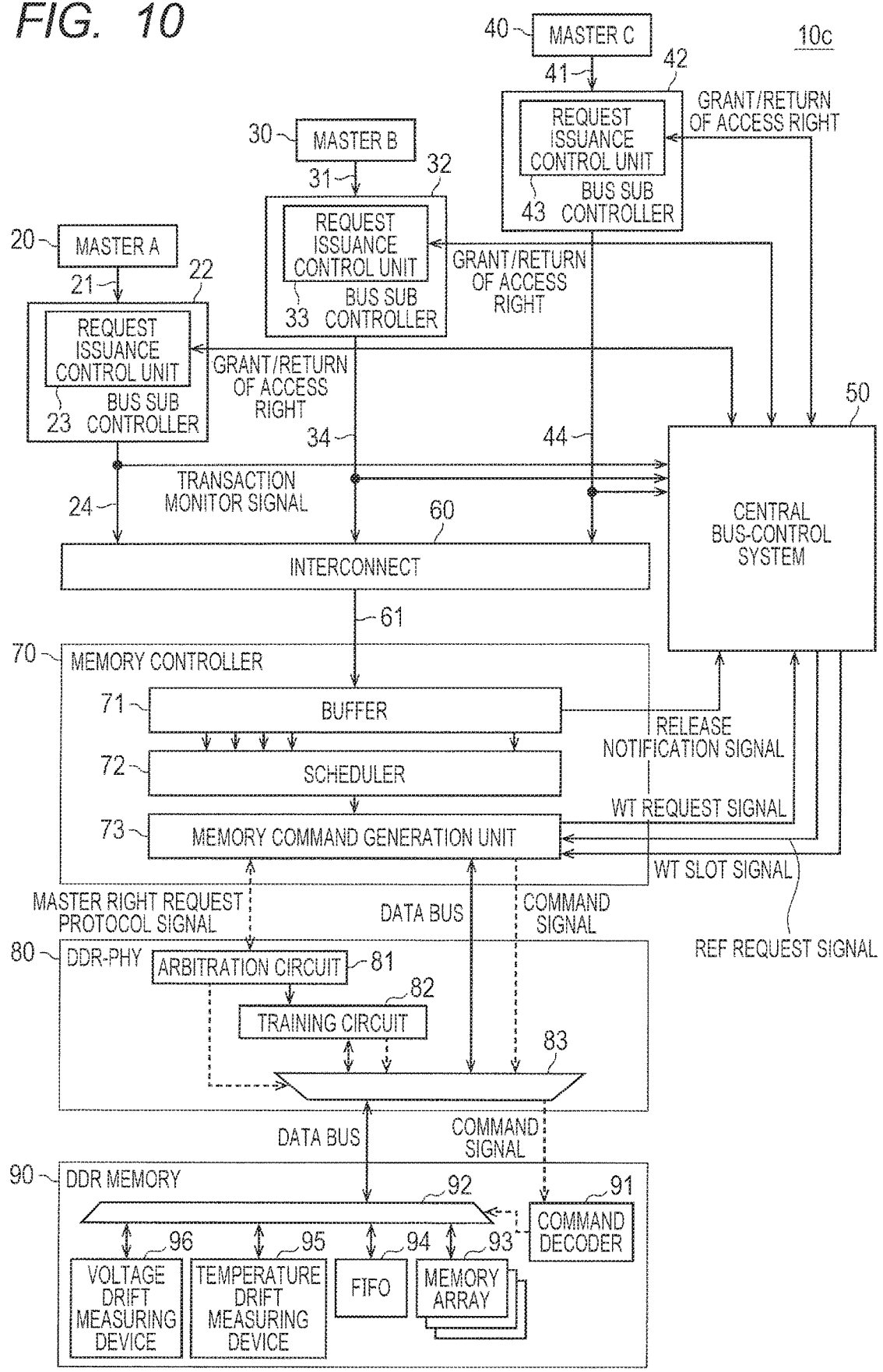
FIG. 10 is a block diagram showing an electronic device including a semiconductor device according to a second modification.

A second modification will be discussed below. FIG. 10 shows an electronic device including a semiconductor device according to the second modification. An electronic device 10c according to the present modification is different from the electronic device 10 according to the first embodiment in FIG. 1 mainly in that a memory command generation unit 73 outputs a WT request signal for requesting the execution of write training to a central bus-control system 50. Other points may be similar to those of the first embodiment, the second embodiment, the third embodiment, or the first modification.

In the present embodiment, LPDDR4 memory is used as memory 90. The memory 90 includes a temperature drift measuring device 95 and a voltage drift measuring device 96. A memory controller acquires the measurement result of the temperature drift measuring device 95 and the measurement result of the voltage drift measuring device 96 and decides whether the acquired measurement results satisfy predetermined conditions. If it is decided that the predetermined conditions are satisfied, the memory controller 70 causes a training circuit 82 to conduct write training through the central bus-control system 50.

In the memory controller 70, the memory command generation unit 73 outputs, to the memory 90, a command signal for acquiring the measurement result of the temperature drift measuring device 95 (temperature drift measurement result) and a command signal for acquiring the measurement result of the voltage drift measuring device 96 (voltage drift measurement result). These command signals (read) are treated as ordinary read and write commands to the memory 90. When receiving the command signal, the memory 90 outputs the temperature drift measurement result and the voltage drift measurement result to the memory controller 70. The memory command generation unit 73 can read the temperature drift measurement result and the voltage drift measurement result from the memory 90 in, for example, a transfer time as long as an ordinary read transfer. The memory command generation unit 73 periodically issues the command signals and monitors a temperature change and a voltage fluctuation in the memory 90.

The memory command generation unit 73 decides whether the temperature drift measurement result and the voltage drift measurement result deviate from, for example, a predetermined range. If the memory 90 has a large temperature change and a large voltage fluctuation, it is considered that a timing change is large between a data signal and a clock signal. If the memory command generation unit 73 decides that at least one of the temperature drift measurement result and the voltage drift measurement result deviates from the predetermined range, the memory command generation unit 73 determines the execution of the write training. When the execution of the write training is determined, the memory command generation unit 73 asserts the WT request signal and requests the execution of the write training from the central bus-control system 50. If the memory command generation unit 73 decides that the write training is not to be conducted, the WT request signal is kept negated.

In the present embodiment, a training control unit 54 of the central bus-control system 50 checks the WT request signal in the same period as that in the first embodiment and decides whether to switch an operation mode to a WT phase operation mode. In the first embodiment, the training control unit 54 switches the operation mode to the WT phase operation mode, for example, after the lapse of the predetermined time; whereas in the present modification, before the switching of the operation mode, the training control unit 54 checks whether the WT request signal has been asserted or not. The training control unit 54 decides whether to switch the operation mode according to the checking result. If it is decided that the WT request signal has been asserted, the training control unit 54 switches the operation mode to the WT phase operation mode as scheduled, allowing the execution of the write training. If the WT request signal has not been asserted, the training control unit 54 does not switch the operation mode to the WT phase operation mode and keeps operating in a normal operation mode. The operations of the units in the write training (WT phase) may be similar to those in the foregoing explanation.

In the present modification, the memory command generation unit 73 periodically reads the values of the temperature drift measuring device 95 and the voltage drift measuring device 96 of the memory 90 and decides whether to conduct the write training. The central bus-control system 50 independently decides whether to switch the operation mode to the WT phase operation mode (by hardware) according to the signal state of the WT request signal outputted from the memory command generation unit 73. If the WT request signal is asserted, the central bus-control system 50 switches the operation mode to the WT phase operation mode, thereby conducting the write training when necessary. If the WT request signal is not asserted, the central bus-control system 50 continues an operation in the normal operation mode. Thus, the band of data transfer can be obtained because unnecessary write training is not conducted. In the present modification, the write training is conducted by hardware, achieving finer control than in software control (CPU control).

In the embodiments and the modifications, it is assumed that LPDDR4 is mainly used for the memory 90. The memory 90 is not limited to LPDDR4. The memory 90 may be another memory, e.g., DDR3 memory that does not include the temperature drift measuring device 95, the voltage drift measuring device 96, or the training FIFO 94. If the memory 90 does not include the temperature drift measuring device 95 and the voltage drift measuring device 96, the measuring devices may be mounted outside the memory 90 and the measurement values of the measuring devices may be acquired by the memory command generation unit 73. If the memory 90 does not include the training FIFO 94, for example, the region of a part of the memory array 93 may be acquired as a training region that is prohibited from being used in an actual operation, and the write training may be conducted in the region.

The invention made by the present inventors was specifically described according to the embodiments. The present invention is not limited to the foregoing embodiments. Obviously, various changes can be made within the scope of the invention.

For example, at least a part of the embodiments can be described as in the following notes but is not limited thereto.

[Appendix 1]

A semiconductor device comprising:

a master that issues access requests comprising a read request and a write request to memory;

a memory controller that is coupled to the master via a bus and accesses the memory according to the access requests;

an access control unit that controls the output of the access requests to the memory controller, the access requests being issued by the master; and a training circuit that conducts training on the memory while the access to the memory is stopped, the access control unit further controlling the execution of the training and suppressing the output of the read request to the memory controller from among the access requests issued by the master during the execution of the training.

[Appendix 2]

The semiconductor device according to appendix 2, further comprising a physical layer interface having the training circuit between the memory and the memory controller.

[Appendix 3]

The semiconductor device according to appendix 2, wherein the physical layer interface further includes an arbitration circuit that requests the acquisition of the control right of the memory from the memory controller and acquires the control right from the memory controller, and wherein the training circuit conducts the training if the arbitration circuit acquires the control right.

[Appendix 4]

The semiconductor device according to appendix 3, wherein the access control unit notifies the memory controller of the execution of the training, and wherein the memory controller grants the control right to the arbitration circuit when receiving the notification of the execution of the training from the access control unit.

[Appendix 5]

The semiconductor device according to appendix 4, wherein at the completion of the training, the arbitration circuit returns the control right to the memory controller.

[Appendix 6]

The semiconductor device according to appendix 5, wherein the arbitration circuit requests the acquisition of another control right from the memory controller after the control right is returned.

[Appendix 7]

The semiconductor device according to appendix 3, wherein the access control unit notifies the arbitration circuit of the execution of the training, and wherein the arbitration circuit requests the acquisition of the control right from the memory controller when receiving the notification of the execution of the training.

[Appendix 8]

The semiconductor device according to appendix 1, wherein the bus includes a read request bus for transmitting the read request and a write request bus for transmitting the write request, wherein the access control unit includes a bus sub controller that has request issuance control units arranged for the read request bus and the write request bus, respectively, and a central bus-control system that separately grants access rights to the request issuance control units arranged for the read request bus and the write request bus, wherein if the access rights are granted from the central bus-control system, the request issuance control units arranged for the read request bus and the write request bus output the read and write requests issued by the master to the memory controller, and wherein if the access rights are not granted, the request issuance control units suppress the output of the read and write requests issued by the master to the memory controller.

[Appendix 9]

The semiconductor device according to appendix 1, wherein the access control unit starts suppressing the output of the read request at a predetermined time before the start of the training.

[Appendix 10]

The semiconductor device according to appendix 1, wherein the master comprises a first master, wherein the semiconductor device further comprises a second master that is coupled to the memory controller via a bus, and that issues the access requests including the read request and the write request to the memory, wherein the access control unit controls an output of the access requests issued by the second master to the memory controller, and controls suppressing an output of the read request to the memory controller from among the access requests issued by the second master during the execution of the training, and wherein the semiconductor device further comprises an interconnect that arbitrates the access requests inputted from the first and the second masters and outputs the access requests to the memory controller.

[Appendix 11]

The semiconductor device according to appendix 10, wherein the access control unit includes a plurality of bus sub controllers that are arranged for a plurality of buses, respectively, the buses coupling the first and the second masters and the interconnect, and a central bus-control system that grants an access right to each of the bus sub controllers according to the contents of predetermined access control.

[Appendix 12]

The semiconductor device according to appendix 11, wherein each of the bus sub controllers comprises a request issuance control unit, and wherein the request issuance control unit outputs the access request issued by the master to the interconnect if the access right is granted from the central bus-control system, and suppresses the output of the access request issued by the master to the interconnect if the access right is not granted from the central bus-control system.

[Appendix 13]

The semiconductor device according to appendix 12, wherein each of the buses includes a read request bus for transmitting the read request and a write request bus for transmitting the write request, wherein the request issuance control units are arranged for the read request bus and the write request bus, respectively, in each of the bus sub controllers, and wherein the central bus-control system separately grants the access rights to the request issuance control unit arranged for the read request bus and the request issuance control unit arranged for the write request bus.

[Appendix 14]

The semiconductor device according to appendix 10, wherein the second master is given a lower priority than the first master, and wherein the access control unit suppresses the output of the read request and the write request, which are issued by the second master, to the memory controller, and suppresses the output of the read request, which is issued by the first master, to the memory controller during the execution of the training.

[Appendix 15]

The semiconductor device according to appendix 14, wherein the access control unit starts suppressing the output of the read request and the write request, which are issued by the second master, at first timing before the start of the training and at a predetermined time from the start of the training, and the access control unit starts suppressing the output of the read request, which is issued by the first master, at second timing before the start of the training and after the first timing.

[Appendix 16]

The semiconductor device according to appendix 15, wherein the access control unit releases the output of the read request, which is issued by the first master, at third timing after the completion of the training, and the access control unit releases the output of the read and write requests, which are issued by the second master, at fourth timing after the third timing.

[Appendix 17]

The semiconductor device according to appendix 1, wherein the memory is configured so as to perform a refreshing operation, and wherein the access control unit further controls the execution of the refreshing operation and causes the memory to perform the refreshing operation at the start of the training.

[Appendix 18]
The semiconductor device according to appendix 17, wherein the access control unit further causes the memory to perform the refreshing operation at the completion of the training.

[Appendix 19]
The semiconductor device according to appendix 1, wherein the memory controller includes a request buffer that receives and stores the access request, a scheduler that selects the access request stored in the request buffer, and a memory command generation unit that accesses the memory in response to the access request selected by the scheduler.

[Appendix 20]
The semiconductor device according to appendix 19, wherein the access control unit outputs a training phase signal to the memory controller before the start of the training, the training phase signal indicating a period associated with the execution of the training, and the access control unit starts suppressing the output of the read request after a lapse of a predetermined time from the output of the training phase signal, and
wherein the scheduler preferentially selects, while the training phase signal is outputted, the read request from among the access requests stored in the request buffer.

[Appendix 21]
The semiconductor device according to appendix 20, wherein the access control unit releases the output of the read request after the completion of the training, and
wherein the scheduler stops the output of the training phase signal after a lapse of a predetermined period from the release of the output of the read request.

[Appendix 22]
The semiconductor device according to appendix 1, wherein the access control unit causes the training circuit to periodically conducts the training.

[Appendix 23]
The semiconductor device according to appendix 1, wherein the memory includes a measuring circuit that measures at least one of a voltage and a temperature, and
wherein the memory controller acquires the measurement result of the measuring circuit and causes the training circuit to conduct the training if the acquired measurement result satisfies predetermined conditions.

[Appendix 24]
The semiconductor device according to appendix 1, wherein the training includes skew adjustment between signals to be inputted to the memory.

[Appendix 25]
The semiconductor device according to appendix 1, wherein the training includes write training for adjusting the timing of a clock signal and a data signal to be inputted to the memory.

[Appendix 26]
The semiconductor device according to appendix 1, wherein the training includes read training for adjusting the timing of a clock signal and a data signal outputted from the memory.

[Appendix 27]
The semiconductor device according to appendix 1, wherein the memory is double-data-rate synchronous dynamic random access memory (DDR-SDRAM).

[Appendix 28]
The semiconductor device according to appendix 1, wherein the access control unit controls the output of the access request to the memory controller based on quality of service (QoS) information set for the master.

[Appendix 29]
An access control method comprising:
issuing, to memory, access requests including a read request and a write request from a master;
controlling the output of the access requests issued by the master to a memory controller that receives the access requests from the master through a bus and accesses the memory according to the received access requests; and
conducting training on the memory while the access to the memory is stopped, and
wherein in the control of the output of the access requests, the output of the read request to the memory controller is suppressed during the training from among the access requests issued by the master.

[Appendix 30]
A semiconductor device comprising:
a master that issues access requests comprising a read request and a write request to memory;
a memory controller that is coupled to the master via a bus and accesses the memory according to the access requests;
an access control unit that controls the output of the access requests to the memory controller by controlling the grant of an access right in response to the access requests issued by the master; and
a training circuit that conducts training on the memory while the access to the memory is stopped,
wherein the access control unit further controlling the execution of the training, and
wherein the access control unit being configured so as to switch an operation mode between a first operation mode and a second operation mode, the access right is granted in the first mode according to the contents of predetermined access control in response to the access requests issued by the master, the training is conducted in the second operation mode, the access right is granted according to the contents of the predetermined access control in response to the write request from among the access requests issued by the mater, and the access right is not granted in response to the read request from among the access requests issued by the master.

[Appendix 31]
The semiconductor device according to appendix 30, wherein the access control unit periodically conducts the training by periodically switching the operation mode from the first operation mode to the second operation mode.

[Appendix 32]
The semiconductor device according to appendix 30, wherein after the switching from the first operation mode to the second operation mode, the access control unit stops the grant of the access right in response to the read request from among the access requests issued by the master, and the access control unit conducts the training after a lapse of a predetermined time from the stop of the grant of the access right.

[Appendix 33]
The semiconductor device according to appendix 30, wherein the master comprises a first master,
wherein the semiconductor device further comprises a second master that is coupled to the memory controller via a bus, and that issues the access requests including the read request and the write request to the memory,
wherein the access control unit controls the output of the access requests to the memory controller by controlling the grant of an access right in response to the access requests issued by the second master,
wherein the access control unit is configured so as to switch an operation mode between a first operation mode and a second operation mode, the access right is granted in the first mode according to contents of predetermined access control in response to the access requests issued by the second master, the training is conducted in the second operation mode, the access right is granted according to the contents of the predetermined access control in response to the write request from among the access requests issued by the second mater, and the access right is not granted in response to the read request from among the access requests issued by the second master, wherein a priority of the second master is a lower than that of the first master, and wherein the access control unit in the second operation mode grants the access right according to the contents of the predetermined access control in response to the write request from among the access requests issued by the first master, the access control unit does not grant the access right in response to the read request from among the access requests issued by the first master, and the access control unit does not grant the access right in response to the access requests issued by the second master.

[Appendix 34]

The semiconductor device according to appendix 33, wherein after the switching from the first operation mode to the second operation mode, the access control unit stops the grant of the access right in response to the access request issued by the second master, after a lapse of a predetermined time from the stop of the grant of the access right in response to the access request, the access control unit stops the grant of the access right in response to the read request from among the access requests issued by the first master, and after a lapse of a predetermined time from the stop of the grant of the access right in response to the read request, the access control unit conducts the training.

[Appendix 35]

The semiconductor device according to appendix 34, wherein after the completion of the training, the access control unit releases the grant of the access right in response to the read request from among the access requests issued by the first master, and after a predetermined time from the release of the grant of the access right, the access control unit switches the operation mode from the second operation mode to the first operation mode so as to release the grant of the access right in response to the access request issued by the second master.

What is claimed is:

1. A semiconductor device comprising:
    a first master which is configured to issue a write request and a read request;
    a memory controller which includes a buffer configured to store the write request and the read request, and which is configured to access a memory in accordance with the write request and the read request stored in the buffer;
    a central bus-control system which is configured to output first access-right granting signals and a training slot signal, and which is operable by switching between a first operation mode and a second operation mode;
    a first write request issuance control unit which is coupled between the first master and the memory controller, which is configured to receive the write request issued from the first master, and which is configured to output, to the memory controller, the write request received from the first master in response to the first access-right granting signal;
    a first read request issuance control unit which is coupled between the first master and the memory controller, which is configured to receive the read request issued from the first master, and which is configured to output, to the memory controller, the read request received from the first master in response to the first access-right granting signal; and
    a training circuit which is configured to execute training for the memory in response to the training slot signal,
    wherein the central bus-control system comprises a training control unit and a grant selection control unit,
    wherein the training control unit is configured to notify the grant selection control unit of switching between the first operation mode and the second operation mode, and which is configured to generate the training slot signal,
    wherein the grant selection control unit is configured to generate the first access-right granting signals based on free space information on the buffer, Quality of Service (QoS) information of the first master and notifying of switching between the first operation mode and the second operation mode, and is configured to output the first access-right granting signal to the first write request issuance control unit and the first read request issuance control unit, respectively,
    wherein the central bus-control system is configured to operate in the first operation mode during a first period,
    wherein the first period includes a second period including a period during which the training is executed, and a third period including a period the training is not executed,
    wherein the grant selection control unit is configured to output the first access-right granting signal to the first write request issuance control unit in the first period;
    wherein the grant selection control unit is configured not to output the first access-right granting signal to the first read request issuance control unit in the second period; and
    wherein the grant selection control unit is configured to output the first access-right granting signal to the first read request issuance control unit in the third period.

2. The semiconductor device according to claim 1,
    wherein the central bus-control system is configured to operate in the second operation mode during a fourth period, and
    wherein, in the fourth period, the grant selection control unit is configured to output the first access-right granting signal to the first write request issuance control unit and the first read request issuance control unit, respectively.

3. The semiconductor device according to claim 1, wherein, when receiving the write request from the first write request issuance control unit during the period during which the training is executed, the memory controller is configured to store the write request received from the first write request issuance control unit in the buffer.

4. The semiconductor device according to claim 1,
    wherein the memory controller further comprises:
        a scheduler which is configured to select one of the write request and the read request stored in the buffer; and
        a memory command generation unit which is configured to access the memory in accordance with the one of the write request and the read request selected by the scheduler,
    wherein the scheduler is configured to preferentially select the read request from among the write request and the read request stored in the buffer in the period during which the training is not executed in the first period.

5. The semiconductor device according to claim 1,
wherein the second period includes a part of the period during which the training is not executed, and
wherein the part of the period is before switching to the period during which the training is executed.

6. The semiconductor device according to claim 1, wherein the third period includes a period before and after switching between the first operation mode and the second operation mode.

7. The semiconductor device according to claim 1, further comprising:
a second master which is configured to issue a write request and a read request;
a second write request issuance control unit which is coupled between the second master and the memory controller; and
a second read request issuance control unit which is coupled between the second master and the memory controller,
wherein the grant selection control unit is configured to generate second access-right granting signals based on the free space information on the buffer, QoS information of the second master and notifying of switching between the first operation mode and the second operation mode, and is configured to output the second access-right granting signal to the second write request issuance control unit and the second read request issuance control unit, respectively,
wherein the second write request issuance control unit is configured to receive the write request issued from the second master, and which is configured to output, to the memory controller, the write request received from the second master in response to the second access-right granting signal,
wherein the second read request issuance control unit is configured to receive the read request issued from the second master, and which is configured to output, to the memory controller, the read request received from the second master in response to the second access-right granting signal, and
wherein the grant selection control unit is configured not to output the second access-right granting signal to the second write request issuance control signal and the second read request issuance control unit in the first period.

8. The semiconductor device according to claim 7,
wherein the central bus-control system is configured to operate in the second operation mode during a fourth period, and
wherein, in the fourth period, the grant selection control unit is configured to output the second access-right granting signal to the second write request issuance control unit and the second read request issuance control unit, respectively.

9. The semiconductor device according to claim 7,
wherein the first master is a master where a real-time property needs to be ensured, and
wherein the second master is a master where the real-time property does not need to be ensured.

10. The semiconductor device according to claim 1, further comprising an interconnect which is coupled between the first master and the memory controller, and between the second master and the memory controller, and which is configured to arbitrate the write request and the read request issued from the first master, and the write request and the read request issued from the second master based on a priority set for the first master and a priority set for the second master.

11. The semiconductor device according to claim 1,
wherein the central bus-control system further comprises a refresh control unit,
wherein the training control unit is configured to notify the refresh control unit of switching between the first operation mode and the second operation mode,
wherein the refresh control unit is configured to receive notifying of switching between the first operation mode and the second operation mode to generate a refresh request signal, and is configured to output the refresh request signal to the memory controller, and
wherein the memory controller is configured to cause the memory to execute a refresh operation in the period during the training is executed.

* * * * *